(12) United States Patent
Sekine et al.

(10) Patent No.: US 7,711,473 B2
(45) Date of Patent: May 4, 2010

(54) MAP DATA UPDATE METHOD AND NAVIGATION APPARATUS

(75) Inventors: Minoru Sekine, Shinagawa (JP); Kohei Otsuki, Iwaki (JP); Takashi Wakasugi, Shinagawa (JP); Hitoshi Konishi, Haga (JP); Masayuki Arai, Haga (JP)

(73) Assignees: Alpine Electronics, Inc., Tokyo (JP); Honda Motor Co., Ltd., Tokyo (JP); Mobilemedia Brain Association, Inc., Tokyo (JP)

( * ) Notice: Subject to any disclaimer, the term of this patent is extended or adjusted under 35 U.S.C. 154(b) by 162 days.

(21) Appl. No.: 11/639,371

(22) Filed: Dec. 14, 2006

(65) Prior Publication Data

US 2007/0156759 A1 Jul. 5, 2007

(30) Foreign Application Priority Data

Dec. 15, 2005 (JP) ............................. 2005-361556

(51) Int. Cl.
*G06F 17/30* (2006.01)
(52) U.S. Cl. .................. 701/200; 701/201; 701/208
(58) Field of Classification Search ........... 701/200, 701/201, 208
See application file for complete search history.

(56) References Cited

U.S. PATENT DOCUMENTS

| | | | | | |
|---|---|---|---|---|---|
| 5,944,768 | A | * | 8/1999 | Ito et al. | 701/200 |
| 6,021,371 | A | * | 2/2000 | Fultz | 701/200 |
| 6,035,253 | A | * | 3/2000 | Hayashi et al. | 701/211 |
| 6,049,754 | A | * | 4/2000 | Beaton et al. | 701/204 |
| 6,076,041 | A | * | 6/2000 | Watanabe | 701/211 |
| 6,169,955 | B1 | * | 1/2001 | Fultz | 701/200 |
| 6,862,500 | B2 | * | 3/2005 | Tzamaloukas | 701/1 |
| 6,925,378 | B2 | * | 8/2005 | Tzamaloukas | 701/200 |
| 6,980,907 | B2 | | 12/2005 | Umezu et al. | |
| 2003/0212567 | A1 | * | 11/2003 | Shintani et al. | 705/1 |
| 2003/0220735 | A1 | * | 11/2003 | Nimura | 701/208 |
| 2004/0230370 | A1 | * | 11/2004 | Tzamaloukas | 701/200 |
| 2004/0230373 | A1 | * | 11/2004 | Tzamaloukas | 701/208 |
| 2004/0236498 | A1 | * | 11/2004 | Le et al. | 701/200 |
| 2004/0260458 | A1 | * | 12/2004 | Park et al. | 701/200 |
| 2005/0216191 | A1 | * | 9/2005 | Sumizawa et al. | 701/211 |
| 2006/0095202 | A1 | * | 5/2006 | Atarashi et al. | 701/208 |
| 2007/0106463 | A1 | * | 5/2007 | Nomura | 701/208 |
| 2007/0129082 | A1 | * | 6/2007 | Thacher | 455/456.1 |
| 2007/0244636 | A1 | * | 10/2007 | Horikami | 701/208 |
| 2007/0271029 | A1 | * | 11/2007 | Tzamaloukas | 701/200 |

FOREIGN PATENT DOCUMENTS

| | | |
|---|---|---|
| JP | 2004-12319 | 1/2004 |
| JP | 2004-295207 | 10/2004 |

* cited by examiner

*Primary Examiner*—Don Wong
*Assistant Examiner*—Kim T Nguyen
(74) *Attorney, Agent, or Firm*—Katten Muchin Rosenman LLP

(57) ABSTRACT

A navigation apparatus is disclosed comprising update functions to update nationwide updated version map data using route-specific update data, and to update the nationwide updated version map data to the next nationwide updated version map data using nationwide update data. A map update processing portion of this navigation apparatus performs updates of map data in the background of navigation control, gives priority to update processing using the route-specific update data over update processing using the nationwide update data, and, if map files to be updated using route-specific update files included in the route-specific update data have not been updated using the nationwide update data, performs updates using the nationwide update data, and then performs updates using route-specific update files.

15 Claims, 28 Drawing Sheets

FIG. 5
(A)
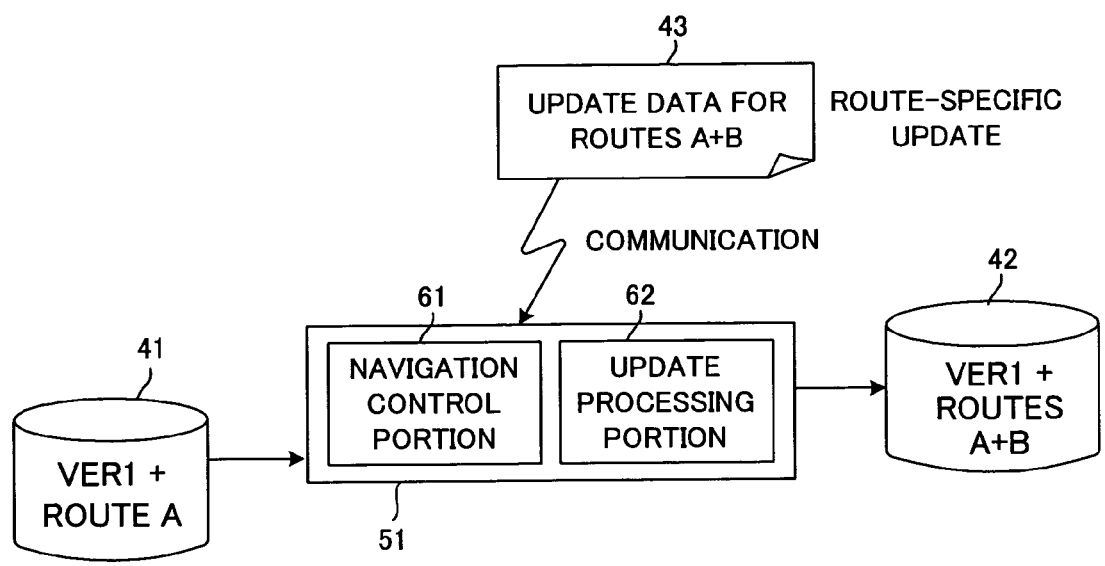
(B)
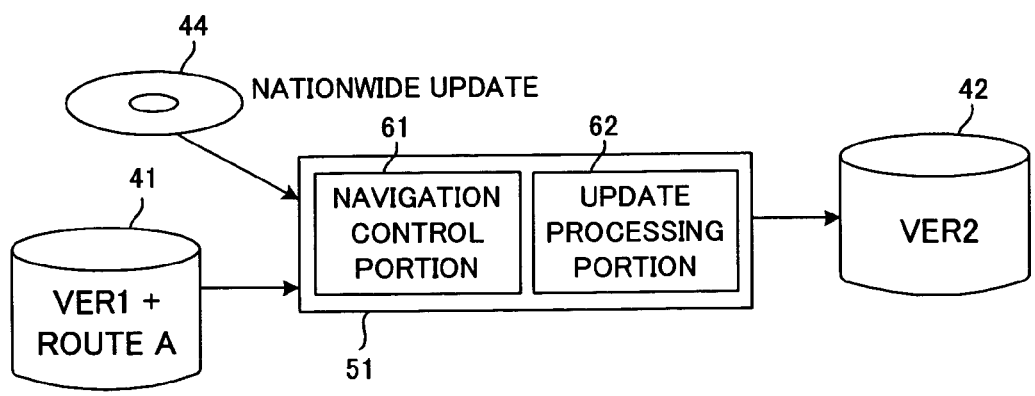

(A)

(B)

DIFFERENCE DATA FILE (UPDATE FILE)

| |
|---|
| NEW MAP FILE: NEW MAP DATA A |
| OLD MAP FILE: LEADING ADDRESS AND SIZE OF COINCIDENCE AREA 1 ($AD_1$, $S_1$) |
| NEW MAP FILE: NEW MAP DATA B |
| OLD MAP FILE: LEADING ADDRESS AND SIZE OF COINCIDENCE AREA 3 ($AD_3$, $S_3$) |
| NEW MAP FILE: NEW MAP DATA C |
| OLD MAP FILE: LEADING ADDRESS AND SIZE OF COINCIDENCE AREA 2 ($AD_2$, $S_2$) |
| NEW MAP FILE: NEW MAP DATA D |

FIG. 12
(A) DATA CONFIGURATION
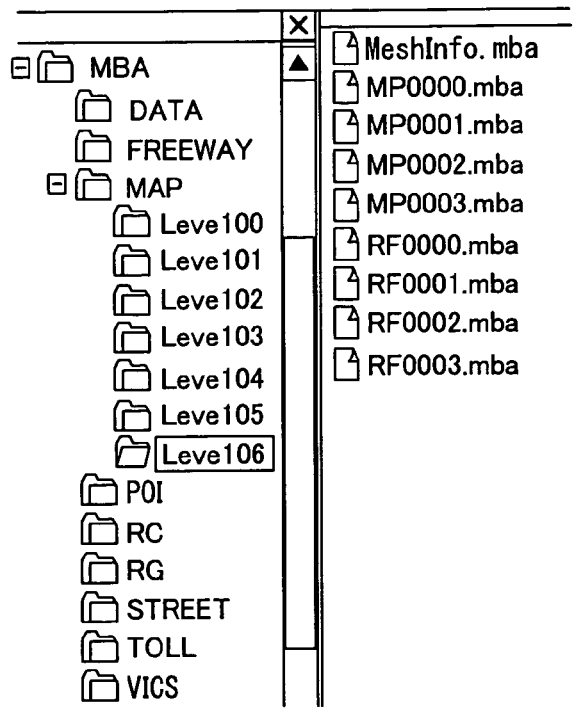
(B)
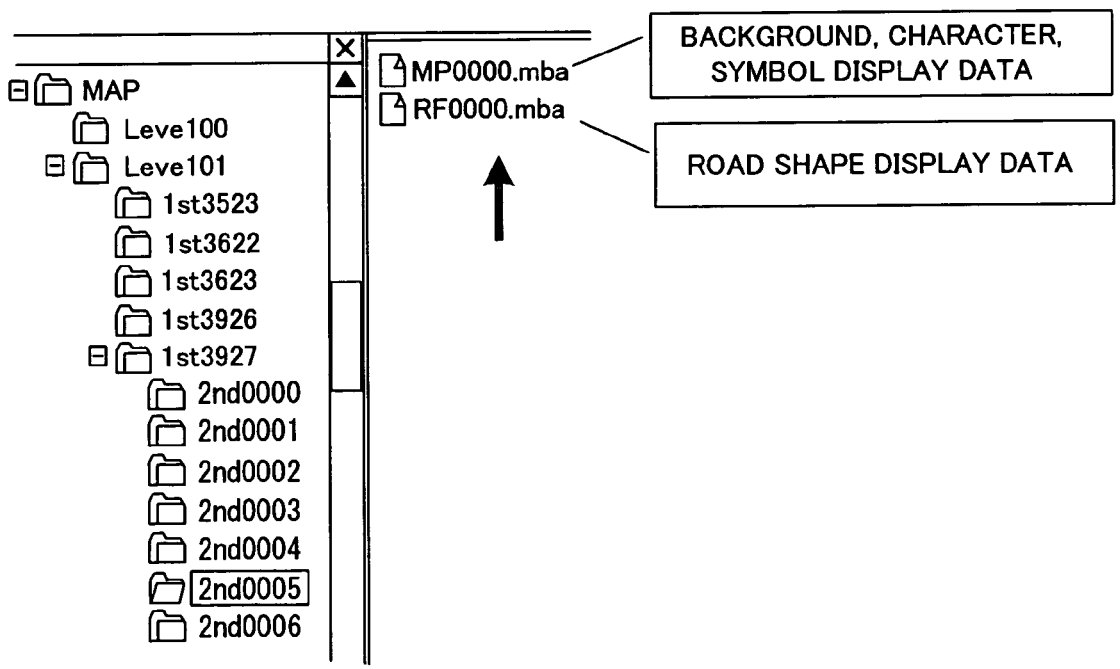

FIG. 13

(A) CONFIGURATION OF INFORMATION SEARCH DATA

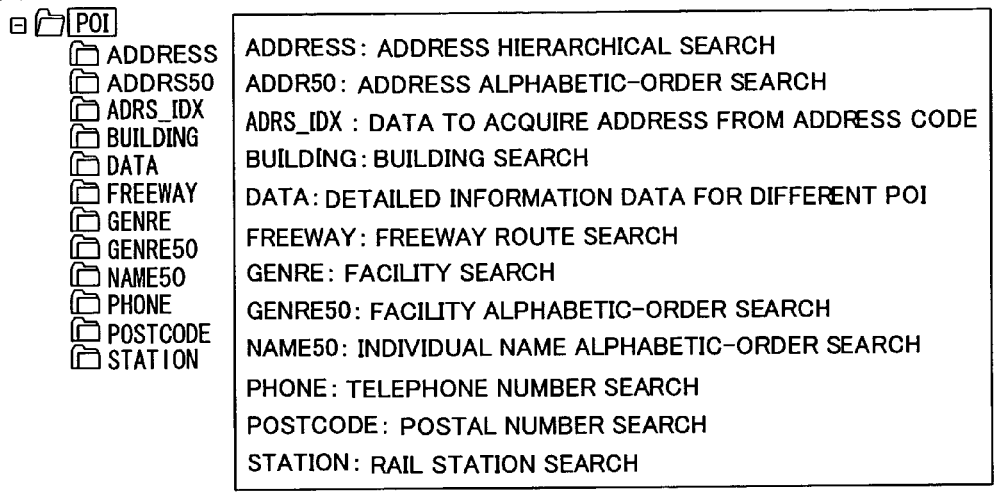

ADDRESS: ADDRESS HIERARCHICAL SEARCH
ADDR50: ADDRESS ALPHABETIC-ORDER SEARCH
ADRS_IDX: DATA TO ACQUIRE ADDRESS FROM ADDRESS CODE
BUILDING: BUILDING SEARCH
DATA: DETAILED INFORMATION DATA FOR DIFFERENT POI
FREEWAY: FREEWAY ROUTE SEARCH
GENRE: FACILITY SEARCH
GENRE50: FACILITY ALPHABETIC-ORDER SEARCH
NAME50: INDIVIDUAL NAME ALPHABETIC-ORDER SEARCH
PHONE: TELEPHONE NUMBER SEARCH
POSTCODE: POSTAL NUMBER SEARCH
STATION: RAIL STATION SEARCH (B) FREEWAY ROUTE SEARCH

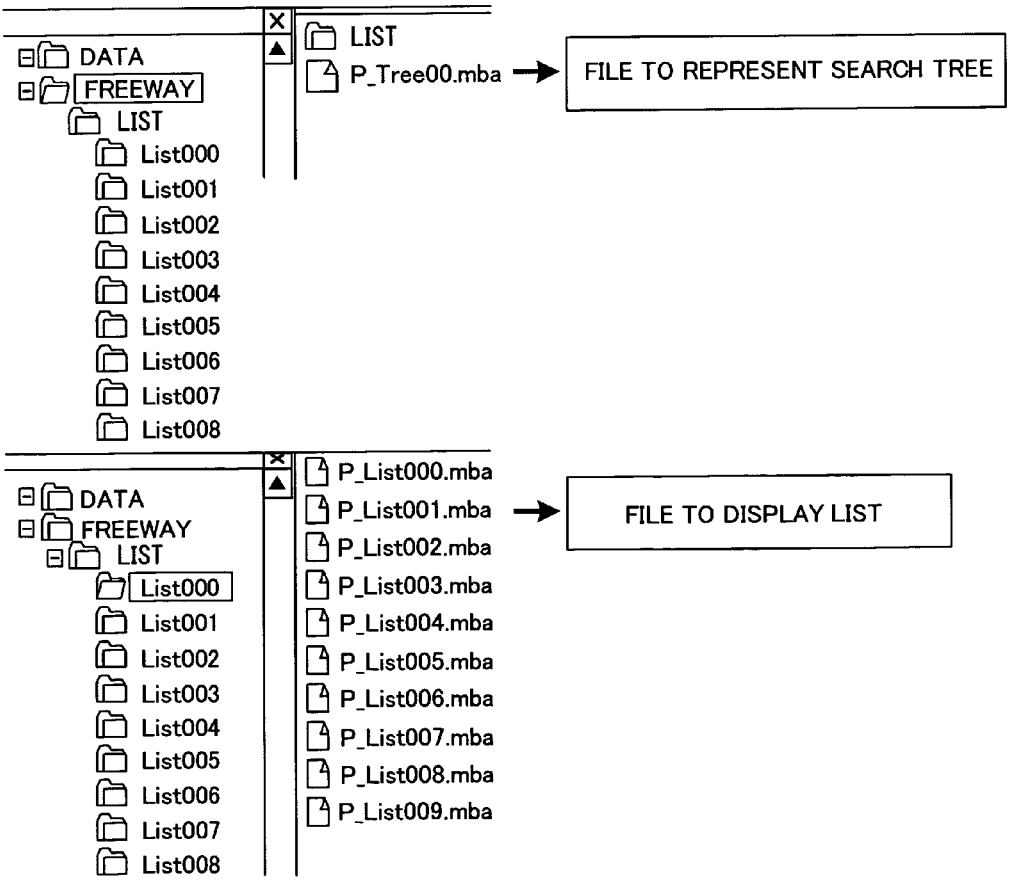

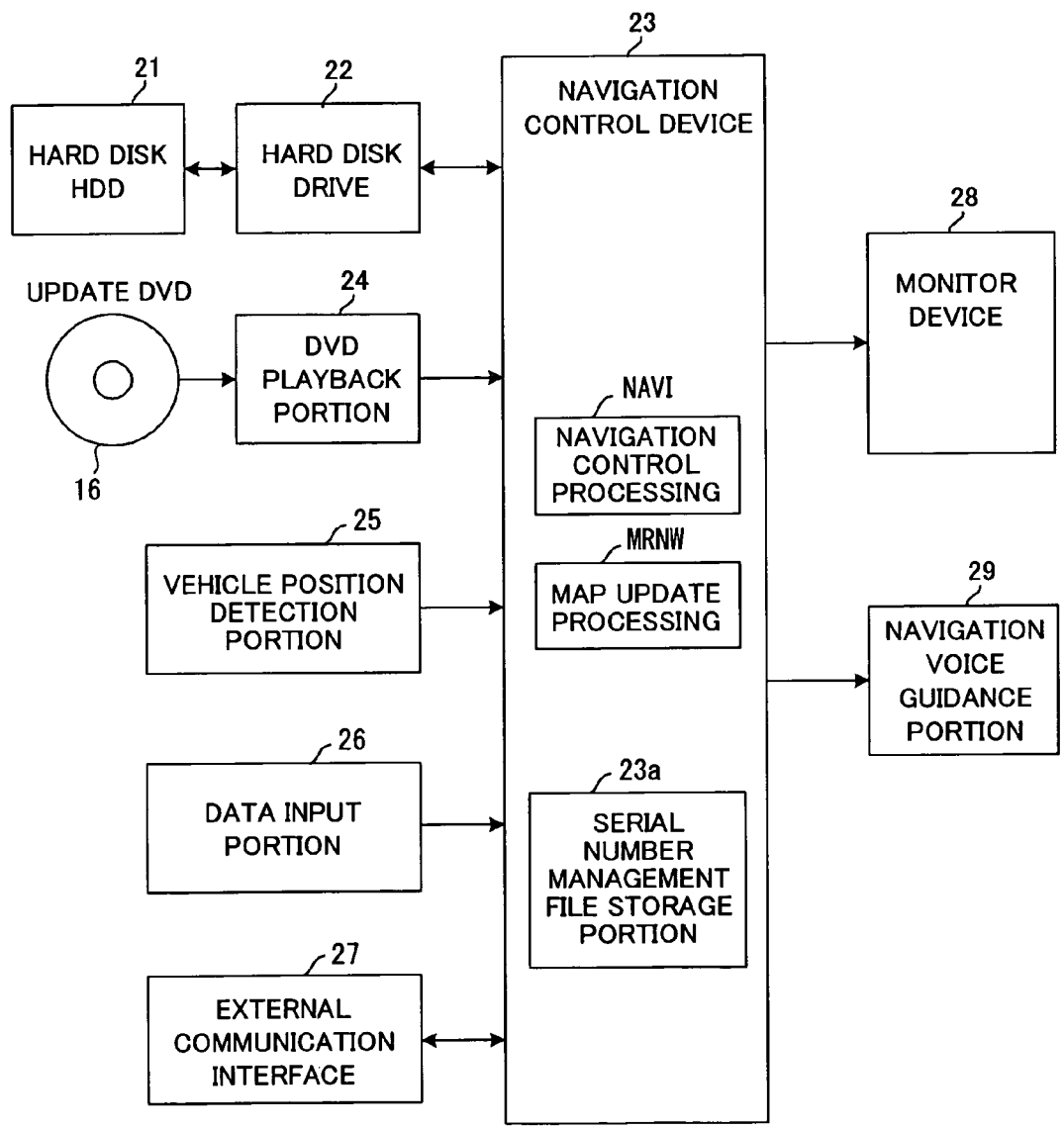
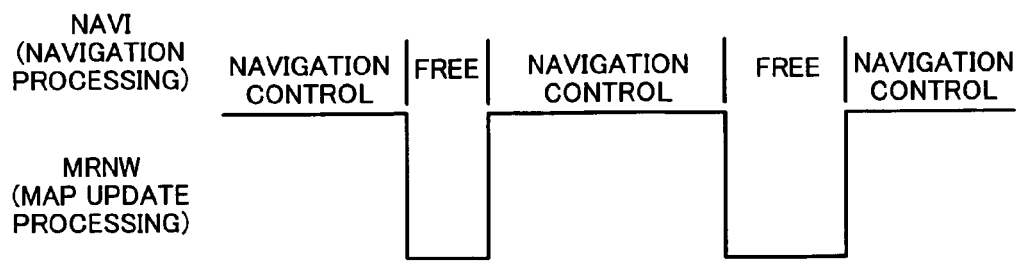

FIG. 20
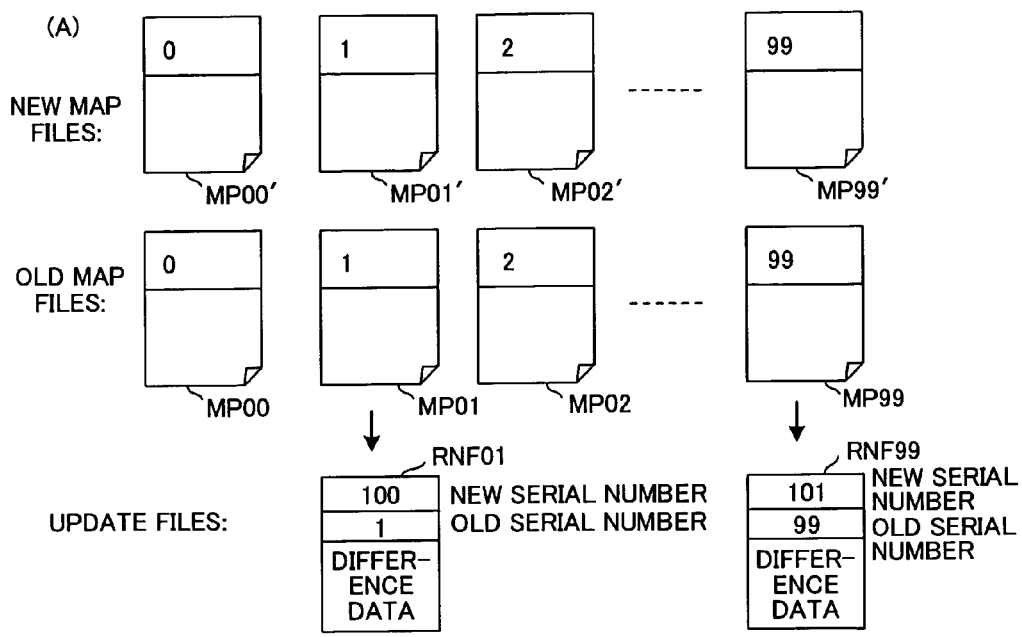
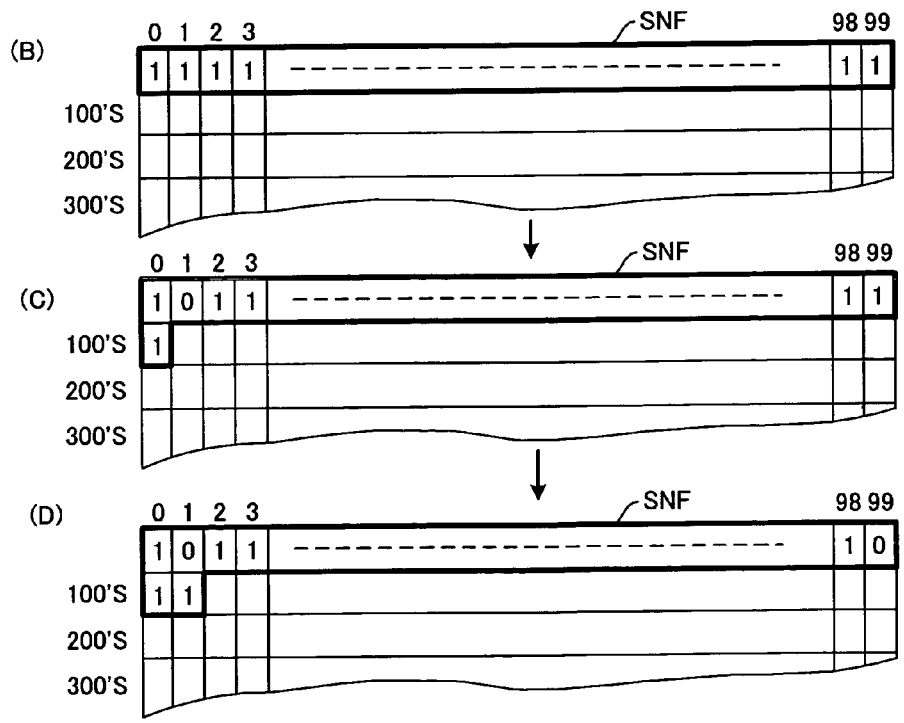

FIG. 22

(A) UPDATE DATA CONFIGURATION

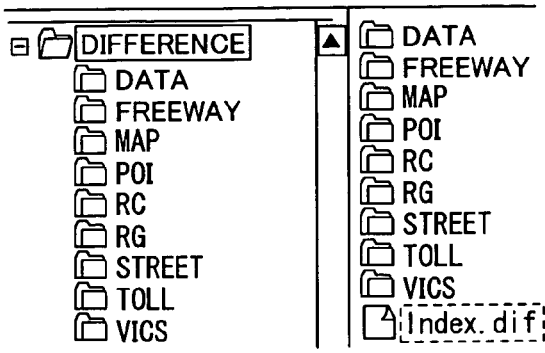

THE FOLLOWING INFORMATION IS STORED:
- VERSION NUMBERS BEFORE AND AFTER UPDATE
- TOTAL NUMBER OF FILES REQUIRING UPDATE
- NUMBER OF FUNCTION DIRECTORIES (B) CONFIGURATION AS FOLLOWS IN FUNCTION UNITS DIFFERENCE

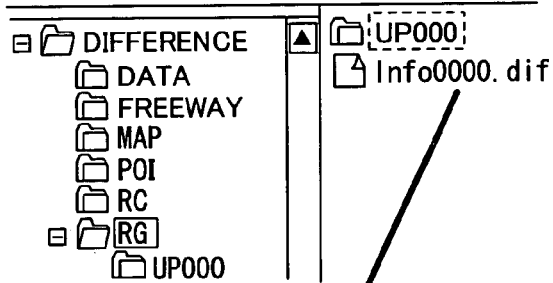

IN THIS FILE, A DIRECTORY TREE IN WHICH UPDATE FILES EXIST IS REPRESENTED

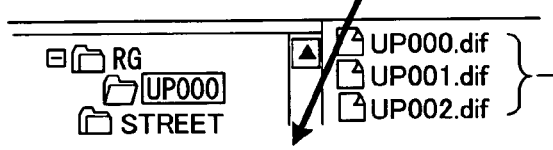

UPDATE DATA ENTITY FILES

DATA STRUCTURE OF Info0000.dif

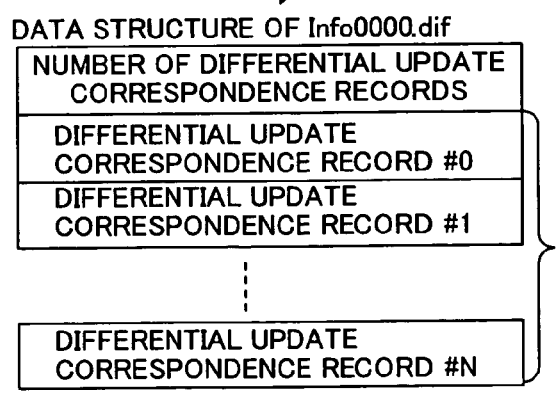

DIRECTORY TREE REPRESENTATION PORTION

DIFFERENTIAL UPDATE CORRESPONDENCE RECORD

| PROCESSING STATE (WHETHER PROCESSING HAS BEEN COMPLETED IN DIRECTORIES BELOW CORRESPONDING DIRECTORY) | |
|---|---|
| DIRECTORY NAME OF DIRECTORY OF INTEREST | (LEVEL 01) |
| NUMBER OF SUBDIRECTORIES | (3) |
| NUMBER OF UPDATE FILES EXISTING IN DIRECTORY | (0) |
| DIFFERENTIAL UPDATE CORRESPONDENCE RECORD NUMBERS CORRESPONDING TO SUBDIRECTORIES | |
| DIFFERENTIAL UPDATE CORRESPONDENCE RECORD NUMBERS CORRESPONDING TO UPDATE FILES IN DIRECTORY | (NONE) |

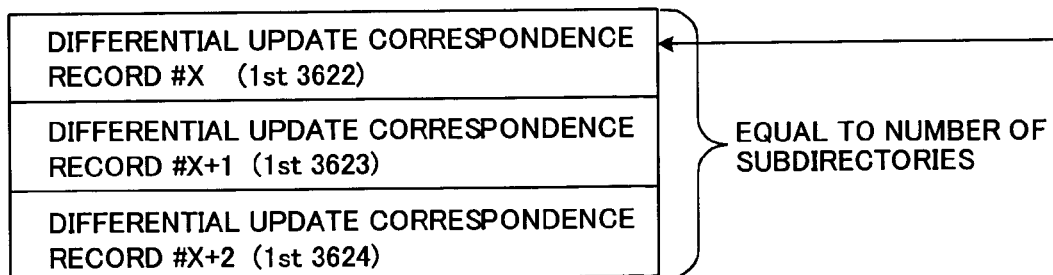

DIFFERENTIAL UPDATE CORRESPONDENCE RECORD #X (1st 3622)
DIFFERENTIAL UPDATE CORRESPONDENCE RECORD #X+1 (1st 3623)
DIFFERENTIAL UPDATE CORRESPONDENCE RECORD #X+2 (1st 3624)

EQUAL TO NUMBER OF SUBDIRECTORIES (B)

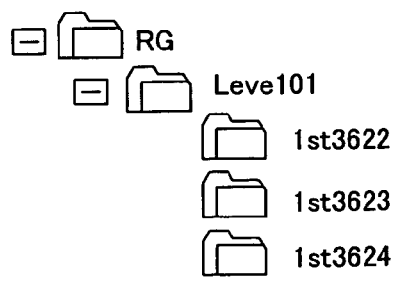

DIFFERENTIAL UPDATE CORRESPONDENCE RECORD

| PROCESSING STATE (WHETHER PROCESSING HAS BEEN COMPLETED IN DIRECTORIES BELOW CORRESPONDING DIRECTORY) |
|---|
| DIRECTORY NAME OF DIRECTORY OF INTEREST (LEVEL 01) |
| NUMBER OF SUBDIRECTORIES (0) |
| NUMBER OF UPDATE FILES EXISTING IN DIRECTORY (2) |
| DIFFERENTIAL UPDATE CORRESPONDENCE RECORD NUMBERS CORRESPONDING TO SUBDIRECTORIES (NONE) |
| DIFFERENTIAL UPDATE CORRESPONDENCE RECORD NUMBERS CORRESPONDING TO UPDATE FILES IN DIRECTORY |

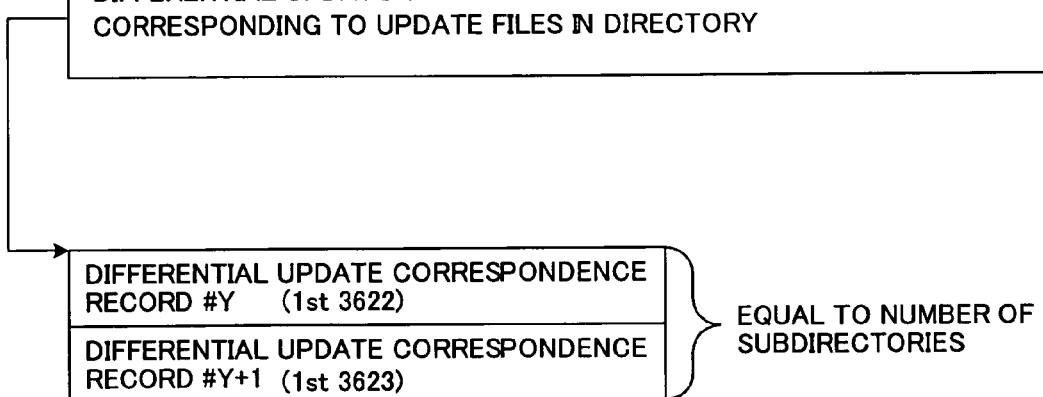

DIFFERENTIAL UPDATE CORRESPONDENCE RECORD #Y (1st 3622)
DIFFERENTIAL UPDATE CORRESPONDENCE RECORD #Y+1 (1st 3623)

} EQUAL TO NUMBER OF SUBDIRECTORIES (B)

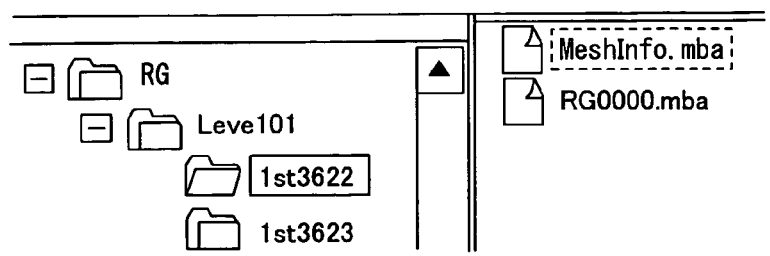

FIG. 25

DIFFERENTIAL UPDATE INFORMATION RECORD

| |
|---|
| PROCESSING STATE (WHETHER PROCESSING HAS BEEN COMPLETED FOR UPDATE FILE OF INTEREST):F |
| NAME OF UPDATE FILE OF INTEREST |
| FLAG INDICATING WHETHER RAW DATA UPDATE OR DIFFERENTIAL UPDATE |
| FILE NUMBER OF UPDATE DATA ENTITY FILE |
| OFFSET FROM BEGINNING OF UPDATE DATA ENTITY FILE |
| UPDATE DATA SIZE |

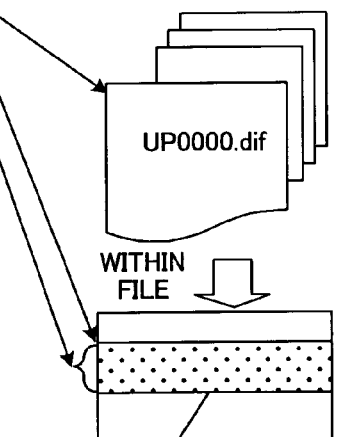

UPDATE DATA ENTITY FILE NUMBER #0 TO #XXXX

UP0000.dif

WITHIN FILE

UPDATE DATA ENTITY OF RG0000.mba. IN CASE OF RAW DATA UPDATE, THIS DATA BECOMES RG0000.mba WITHOUT MODIFICATION. IN CASE OF DIFFERENTIAL UPDATE, THIS DATA IS DIFFERENCE DATA, AND SO "DIFFERENTIAL UPDATE PROCESSING" IS PERFORMED.

MAP DATA UPDATE METHOD AND NAVIGATION APPARATUS

BACKGROUND OF THE INVENTION

This invention relates to a map data update method and to a navigation apparatus, and more particularly relates to a map data update method and navigation apparatus for performing compound updates of nationwide updated versions of map data using route-specific update data and nationwide update data.

A navigation apparatus reads map data from a CD-ROM, DVD, HDD, or other storage media according to the current position of a vehicle, generates map images, and draws maps on a display screen, as well as displaying a vehicle symbol at a fixed position on the display screen, and scrolling the displayed map according to the vehicle travel. Map data comprises (1) road layer information, comprising node data, road link data, intersection data, and similar; (2) background layer information, to display objects on the map; and, (3) character layer information, to display the names of cities, towns and villages, and other characters. Map images displayed on the display screen are generated based on the background layer information and character layer information; route search processing from a departure point to a destination, processing to display the route on a map and provide guidance, map-matching processing, and similar are performed based on the road layer information. In addition to the above, a navigation apparatus comprises POI (Point of Interest) display functions for displaying prescribed POI symbols on maps, map enlargement/reduction functions, map three-dimensional display functions, and various other functions.

Map data stored on recording media becomes out-of-date with the passage of time, due to new road construction and other modifications to topographic data, openings and closings of facilities, preparation of sites for housing, and for other reasons. Hence a method has been proposed in which map data is recorded onto a hard disk HDD or other map storage portion, and when there are modifications to map data, the map data on the hard disk HDD is overwritten with the latest map data. In this technology of the prior art, the user obtains the difference between the new map data and the old map data from a center by means of communication, or purchases an update DVD on which is recorded the difference between the new map data and the old map data, and updates the old map data on the hard disk HDD with the new map data. By this means, the new map data recorded on the hard disk HDD can be used in navigation control, and moreover a DVD player device for use in enjoying music or videos can also be used as a DVD player device for maps; in addition, music and videos can be enjoyed during navigation control.

FIG. 9 is a summary explanatory drawing of update DVD creation processing by an update data creation device.

Map data comprises numerous files, and so in the update data creation device (not shown), processing is performed to extract the differences, for each file, between the new map file NFL for the new version (Ver. 2) and the old map file OFL for the old version (Ver. 1), to create difference data files (update files) $RNF_1$ to $RNF_N$; thereafter, all the update files $RNF_1$ to $RNF_N$ are combined to create the update data, and this update data is written to a DVD to create an update DVD.

(A) of FIG. 10 is a diagram explaining a method of creation, for each file, of difference data files (update files); the new map file NFL and old map file OFL are compared in byte units, a search is performed for data areas 1 to 3 in the old map file OFL which coincides with data areas 1' to 3' in the new map file NFL, and the leading addresses AD1 to AD3 and sizes S1 to S3 of the data areas 1 to 3 are determined as coincidence area identification data. Then, new map data A to D not coincides with the old map data, and the coincidence area identification data, are arranged in order to create the difference data file shown in (B) of FIG. 10. In (A) of FIG. 10, locations at which arrows indicate both are areas at which the data in the old file is the same as that in the new map file; unmatched data DLTM in the old map file OFL is discarded, and the unmatched data A to D in the new map file NFL is used as difference data.

In the example of (A) of FIG. 10, the difference data file is as shown in (B) of FIG. 10. That is, the difference data file comprises the following data.

New map file: New map data A
Old map file: Data identifying coincidence area 1 (leading address $AD_1$, size $S_1$)
New map file: New map data B
Old map file: Data identifying coincidence area 3 (leading address $AD_3$, size $S_3$)
New map file: New map data C
Old map file: Data identifying coincidence area 2 (leading address $AD_2$, size $S_2$)
New map file: New map data D If the difference data file sizes become too large, then there is the problem that time is required by the processing to create new map files from the old map files and the difference data files. Hence the applicants have proposed a method for reducing the sizes of difference data files. In the proposed method, (1) a new map is drawn by the new map data, (2) a replacement range is specified in the new map which has been drawn, (3) the map data portion of the replacement range is created as an additional file, (4) the map data portion of the replacement range is deleted from the old map data, (5) pseudo-new map data is created for use in incorporating the additional file into the old map data after deletion to create a difference data file (update file), and (6) the old map data and the pseudo-new map data are used to create difference data. By this means, only the locations necessary for navigation control, such as for example the map data portions for a newly opened route, can be provided as an additional file, and the size of the difference data file (update file) for the route can be made small.

(A) Principle of Update File Creation

FIG. 11 explains the principle of update file creation; the pseudo-new map data PNMP is created, and using the pseudo-new map data PNMP and the old map data OMP, update data is created.

The additional file creation portion 1 extracts from the new map data NMP the required locations (newly opened routes) and creates an additional file ADF. The additional file incorporation portion 2 creates pseudo-new map data PNMP for use in deleting the portion of map data for additional file incorporation from the old map data OMP, and incorporating the additional file ADF into the old map data after the map data deletion to create update data. The pseudo-new map data PNMP does not completely match the new map data NMP, but includes the necessary modifications (route modification portions). The update data creation portion 3 uses the old map data OMP and the pseudo-new map data PNMP to create an update DVD on which the update data RNM is recorded, by the method explained using FIG. 10.

FIG. 12 and FIG. 13 are figures explaining map data. As shown in (A) of FIG. 12, for each of various functions (DATA, FREEWAY, MAP, POI, RC, RG, STREET, TOLL, VICS), the map data is divided finely by level or area and created with a directory structure, and is recorded on recording media. Among the various functions, DATA is landmark data, junction map data and similar; FREEWAY is freeway data; MAP is map data; POI is POI (Point of Interest) information search data; RC is guidance route search data; and RG is route guidance data and similar.

The map data MAP is in a directory structure, and has seven levels extending from detailed maps (Level 00) to broad-area maps (Level 06); when the maps on each level are divided by a mesh, the map data MAP comprises the data file MP XXXX.mba for map display (data file for road shape display) for each mesh element, and the data files RF XXX.mba for background, character, and symbol display. In (A) of FIG. 12, a Level 06 map (a map of all of Japan) is divided into four mesh elements, and the data files for map display for the mesh elements are MP 000.mba to MP 0003.mba and RF 0000.mba to RF 0003.mba.

(B) in FIG. 12 shows that Level 01 is divided into five 1st mesh elements, and that one 1st mesh element is further divided into seven secondary mesh elements, with the data files for display of a prescribed secondary mesh element (2nd 0005) being MP 0000.mba and RF 0000.mba. From the above, the necessary map display data files MP 0000.mba and RF 0000.mba can be acquired by traversing in order the directory structure, from the Level 01 directory to the 1st3927 directory, and then to the 2nd0005 directory.

(A) of FIG. 13 is an example of the configuration of information search data POI, arranged by search item in a directory structure such that address hierarchical searches, address alphabetic-order searches, building searches, freeway route searches, facility searches, telephone number searches, and similar are possible. (B) of FIG. 13 is an example of the structure of freeway route search data FREEWAY; in the freeway route search directory FREEWAY are two child directories LIST and P_tree00 mba. P_Tree00 mba is a file which represents the search tree. In the directory LIST are directories List 000 to List 008 corresponding to nine regions (Hokkaido, Tohoku, Kanto, Kyushu, and similar); in the Hokkaido list directory List 000 are ten files P_list000.mba to P_list009.mba describing freeway routes.

FIG. 14 explains a method of creating and incorporating an additional file ADF which identifies road addition locations to be added to the old map data. The additional file creation portion 1 (FIG. 11) uses a prescribed new map file NFL, comprising addition locations, to draw a new map 5, and in addition uses the corresponding old map file OFL to draw the old map 6. Then, the additional file creation portion 1 specifies a replacement range 7, encompassing modified roads in the new map 5 thus drawn, and creates a map data portion within the replacement range as an additional file ADF. The additional file incorporation portion 2 deletes the map data portion (deletion portion) DLF within the replacement range 7 from the old map file OFL, and incorporates the additional file ADF into the old map file OFL' after deletion to create a pseudo-new map file PNMF.

(B) Update Data Creation Device

FIG. 15 shows the configuration of the update data creation device 10, and is an example of creating update data and writing the data to a DVD. The map file input portion 11 inputs old map files OFL and new map files NFL (for example, the pseudo-new map files PNMF of FIG. 11) to the difference extraction processing portion 12. The difference extraction processing portion 12 determines, for each map file, the difference data between the old map file OFL and the new map file NFL, and based on the difference data creates a difference data file (update file), which is stored in the update data storage portion 13. At this time, the difference extraction processing portion 12 uses the procedure described below to update a serial number management file SNF held in memory 14 and stores the file in memory 14, as well as inputting this file to the update data storage portion 13.

The update data storage portion 13 stores each update file and the serial number management file SNF as update data, and inputs the update data to a DVD recorder 15 upon a request from the DVD recorder; the DVD recorder 15 writes the update data RNM and serial number management file SNF to a DVD 16 to create an update DVD.

(C) Navigation Apparatus

FIG. 16 shows the configuration of a navigation apparatus 20; the map storage portion (for example, a hard disk HDD) 21 stores map data for use in navigation in a file format, and the hard disk drive 22 reads map data from the hard disk 21 according to instructions from a navigation control device 23, and can write new map data to the hard disk. The DVD playback portion 24 reads update data RNM from an update DVD 16 and inputs the data to the navigation control device 23. The vehicle position detection portion 25 detects the vehicle position and inputs the position to the navigation control device 23. By this means, the navigation control device can control navigation using map data. The data input portion 26 is a touchscreen, remote control device or similar; various commands and data are input, and an external communication interface 27 communicates with external equipment via a portable telephone, the Internet, or other means. It is also possible to communicate with an external update data creation portion and acquire update data RNM, without reading update data RNM from an update DVD 16. The monitor device 28 displays maps for navigation, and displays operation menu screens as appropriate. The navigation voice guidance portion 29 notifies the user by voice of guidance details for approaching intersections (such as whether to turn left or right, the distance remaining to the intersection, and similar).

The navigation control device 23 executes navigation processing NAVI and map update processing MRNW in parallel under multitasking control; but because navigation processing is given higher priority than map update processing, the map update control is performed during free time when navigation control is not being performed, as shown in FIG. 17.

In map update processing, the navigation control device 23 uses update data (update files, serial number management file) read from an update DVD 16 to update map data (old map data) stored on the hard disk 21. Map update processing is performed using update data, in order from for example the north of Japan toward the south, that is, from Hokkaido toward Kyushu (nationwide update processing); when, during navigation processing, a map file for a region which has not been updated is requested, the nationwide update processing is temporarily interrupted, the map data for the region is updated (on-demand update processing), and after completion of on-demand update processing, the nationwide update processing is resumed, and navigation control is performed based on the new map files resulting from on-demand updating.

In update processing, the navigation control device 23 uses update files read from the update DVD 16 and old map files read from the hard disk 21 to create new map files, and the new map files are used to update old map files stored on the hard disk 21. The navigation control device 23 updates the serial numbers of updated map files to new serial numbers comprised by update files, explained below, without modifying the serial numbers of map files which have not been updated.

(E) Serial Numbers

Initially, consecutive serial numbers are assigned, in ascending order from 0, to each map file stored on the hard disk HDD 21 of the navigation apparatus 20. When performing map updates, the navigation apparatus 20 assigns to updated map files consecutive serial numbers in ascending order, starting from the next number after the largest serial number previously assigned, without modifying the serial numbers of map files which have not been updated.

FIG. 18 explains the serial numbers of map files; to simplify the explanation, it is assumed that the number of map files is 100, but in actuality approximately 100,000 files exist.

Initially, as shown in (A) of FIG. 18, serial numbers 0, 1, 2, . . . , 99 are assigned in order to the 100 map files MF00 to MF99. In this state, if update files RNF01 and RNF99 are used to update the map files MF01 and MF99 with serial numbers 1 and 99, as in (B) of FIG. 18, then after updating the serial numbers of the new map files are as shown in (C) of FIG. 18. That is, the serial numbers of map files which have not been updated are not modified, and the serial numbers of the updated map files MF01 and MF99 are modified, assigning the consecutive ascending serial numbers 100 and 101, which are next after the largest serial number (=99) assigned up to that time.

(F) Serial Number Management File

FIG. 19 explains a serial number management file SNF created by the update data creation device. The difference extraction processing portion 12 (see FIG. 15) of the update data creation device 10 writes a "valid" bit ("1") at bit positions corresponding to the serial numbers 100 and 101 of the new map files, as shown in FIG. 19, and writes an "invalid" bit ("0") at bit positions corresponding to the serial number positions 1 and 99 of the pre-update map files, to create the serial number management file SNF.

The serial number management file SNF is a file of size N bytes. The bit positions of each byte from the leading byte to the Nth byte are positions of serial numbers, and a "1" is recorded in bit positions corresponding to the serial numbers of map files. FIG. 15 shows a 256 kilobyte serial number management file SNF. Because eight serial numbers can be represented by one byte, the last bit of the 256 kilobyte file is a position corresponding to serial number 2,097,152 (=256× 1024×8).

As explained below, the serial numbers and serial number management file SNF can be used to determine whether or not map files stored on the hard disk are map files which need be overwritten or whether or not the map files stored on the hard disk are map files which have been updated.

(G) Update Data Creation Processing

FIG. 20 explains update data creation processing by the update data creation device 10.

As shown in (A) of FIG. 20, the number of map files is assumed to be 100, and initial serial numbers for the 100 map files are 0 to 99. As shown in (B), "valid" bits ("1") are written at bit positions equivalent to the serial numbers 0 to 99 of the serial number management file SNF.

The difference extraction processing portion 12 of the update data creation device 10 compares the old map files MP00 to MP99 with the new map files MP00' to MP99'. Because there are differences between the old map file MP01 and the new map file MP01' and between the old map file MP99 and the new map file MP99', the difference extraction processing portion 12 first determines difference data between the old map file MP01 and the new map file MP01', and based on the difference data and new serial numbers, creates an update file RNF01. However, the difference extraction processing portion 12 writes an "invalid" bit ("0") at the bit position equivalent to the serial number 1 in the serial number management file SNF, as shown in (C), writes a "valid" bit ("1") at the bit position equivalent to the next serial number 100 after the largest serial number (=99) assigned up to that time, and makes 100 a new serial number.

Next, the difference extraction processing portion 12 determines difference data between the old map file MP99 and the new map file MP99', and based on the difference data and new serial numbers, creates the update file RNF99. Here, as indicated in (D), the difference extraction processing portion 12 writes an "invalid" bit ("0") at the bit position equivalent to the serial number 99 in the serial number management file SNF, writes a "valid" bit ("1") at the bit position equivalent to the new serial number 101 which is next after the largest serial number (=100) assigned up till that time, and makes 101 a new serial number. Through the above processing, creation of update files and updating of the serial number management file SNF are completed.

Thereafter, the update data creation device 10 inputs the above-described serial number management file SNF and map update files RNF01 and RNF99 into the navigation apparatus 20, as update data. When updating old map files using update files, the navigation apparatus 20 assigns the new serial numbers held in the update files RNF01 and RNF99 as the serial numbers of the updated map files. Hence the navigation apparatus 20 can refer to the serial number management file SNF stored in the storage portion 23a (see FIG. 16), and by determining whether the serial number position of a map file of interest is set to valid or invalid, can judge whether the map file has been updated.

(H) Background Updates

When navigation processing and map update processing are performed in parallel by means of multitasking processing, there are cases in which map files necessary for navigation control have not yet been updated. In such cases, it is convenient to be able to give priority to updating of these map files, and to use the updated new map files in navigation control. FIG. 21 shows the flow of such update processing (background update processing).

The navigation control device 23 (FIG. 16) reads a map file necessary for navigation control (step 101), and extracts the serial number of the map file (step 102). Then, the navigation control device 23 refers to the serial number management file SNF to check whether "valid" bits ("1") is entered in the position of the serial number of the map file (step 103). If a "1" is entered, the file has been updated; if a "0" is entered, the file has not been updated.

If the file has been updated, the map file which has been read is used to execute navigation control (step 104). If on the other hand the file has not been updated, the update processing being performed in parallel through multitasking control (nationwide update processing) is interrupted (step 105), and on-demand update processing is executed (step 106).

In on-demand update processing, an update file needed to update the map file read in step 101 is read from the update DVD 16, the update file is used to create a new map file (step 106a), and a new serial number is assigned to the new map file (step 106b). Then, the old map file on the hard disk 21 is overwritten with the new map file, to complete the on-demand update processing (step 106c), and the nationwide update processing which had been interrupted is resumed (step 107).

The navigation control device 23 then uses the new map files updated in step 106 to execute navigation control (step 108).

By means of background update processing, even when map files necessary for navigation control have not yet been updated, the navigation control device 23 gives priority to updating of these map files, and the updated new map files can be used in navigation control, so that new map files can always be used in navigation control.

Further, the navigation control device 23 assigns serial numbers to map files, and by referring to the serial number management file based on these serial numbers can easily determine whether a map file stored in the map storage portion has been updated or not, so that background update processing can easily be accomplished.

(I) Update Data

FIG. 22 to FIG. 25 are diagrams explaining update data. As shown in (A) of FIG. 22, the update data which is difference between the old map and new map is indicated by "DIFFERENCE" to which function directories (DATA, FREEWAY, MAP, POI, RC, RG, STREET, TOLL, VICS) and an Index.dif file are connected and files for updating are connected to each function direction. The Index.dif file identifies (1) the version numbers before and after updating, (2) the total number of update files necessary for updating, and (3) the number of function directories to be updated.

Update files are specified for each function by a directory structure. (B) of FIG. 22 explains the directory structure of the function RG (route guidance data); the directories UP000 and Info0000.dif are present in the function directory RG. UP0000 is a directory used for update data entity files (UP000.dif to UP002.dif), and Info0000.dif is a directory with a plurality of lower-level difference update correspondence records #0 to #N.

As shown in (A) of FIG. 23, a difference update correspondence record has the following information:

(1) processing state (indicating whether directories below the directory of interest have been processed), (2) directory name of the directory of interest, (3) number of subdirectories (lower-level directories), (4) number of update files existing in the directory of interest, (5) difference update correspondence record numbers corresponding to subdirectories; and, (6) difference update information record numbers corresponding to update files in the directory of interest.

Using the directory structure in (B) of FIG. 23 as an example, the directory of interest is MBA¥RG¥Level 01, and so the directory name is "Level 01". The number of subdirectories is 3, and the number of update files is 0. Because there are three subdirectories, the difference update correspondence record numbers #X (1st 3622), #X+1 (1st 3623), and #X+2 (1st 3624) of the three subdirectories are identified. However, because the number of update files is 0, no difference update information record numbers are identified.

(A) and (B) in FIG. 24 are another example of a difference update correspondence record, in which the number of subdirectories is 0 and the number of update files is 2; the directory name is "Level 01". Because the number of subdirectories is zero, no difference update correspondence record numbers are identified. However, because the number of update files is two, two difference update information record numbers (identifying update files), 1st 3622 and 1st 3623, are entered.

FIG. 25 is an example of a difference update information record number identifying an update file, and having the following information:

(1) processing state (whether the update file of interest has been processed or not), (2) file name of the update file of interest (RG0000.mba), (3) raw data flag (whether the update file is a file based on a new map file, or is a file based on difference data), (4) file number for the update data entity file, (5) offset from the beginning of the update data entity file, and (6) update data size.

If the update entity file indicated by the update data entity file number has the raw data flag set to on, then the file is a new map file; if the raw data flag is off, then the file is a difference data file (update file).

By means of the above proposed method, various update data for newly opened routes is prepared in advance in an update data creation device, and update data requested by a navigation apparatus is provided; in the navigation apparatus, operation is possible such that old map data stored on a hard disk HDD is updated using the update data. FIG. 26 explains in summary this operation.

The update data is classified into update data common to all users for a nationwide updated version (referred to as nationwide update data) 31, and update data for each route-specific update version, in update performed individually by users (referred to as route-specific update data) 32a, 32b, ..., and these nationwide update data and route-specific update data are created. The update data 31, 32a, 32b, ... are always created based on the nationwide updated version map data (VER1) 30, and, when performing route-specific updates, is created route-specific update data comprising all routes newly opened from the time of release of the nationwide updated version (VER1) until the time of the route-specific update. For example, when, after release of nationwide updated version map data (VER1) 30, routes A and B are newly opened in the order route A→route B, route-specific update data is prepared in the following manner. That is, the following data is created and prepared in a center server (update data creation device):

When route A is newly opened: Route-specific update data 32a for route A to update the nationwide updated version (VER1) 30

When route B is newly opened: Route-specific update data 32b for routes (A+B) to update the nationwide updated version (VER1) 30

...

At time of release of a new nationwide updated version (VER2) 35: Nationwide update data 31 for a nationwide updated version (VER2) 35 to update the nationwide updated version (VER1) 30

In this state, if the vehicle navigation apparatus CNV acquires the update data 32a for route A from the server via a wireless terminal MS and updates the map data stored on the hard disk HDD, the map data is updated to a new map (VER1+route A) 33 with the map data of route A added. Similarly, if the navigation apparatus CNV acquires the update data 32b for routes (A+B) from the server via the wireless terminal MS and updates the map data stored on the hard disk HDD, the map data is updated to a new map (VER1+route A+route B) 34 with the map data for route A and route B added. Further, if all update data 31 is acquired, either by communication or through a purchased DVD, and the map data stored on the hard disk HDD is updated, then the map data is updated to the nationwide updated version of the map data (VER2) 35.

However, as explained above, update data is always created based on the nationwide updated version (VER1) 30. Hence prior to updating map data stored on the hard disk using update data, it is necessary to store data which is needed to restore this nationwide updated version (VER1) 30. The data needed to restore this nationwide updated version (VER1) 30 is pre-update map files.

FIG. 27 explains map update processing by the navigation apparatus; prior to using route-specific update data 32a (FIG. 26) to update map data of the nationwide updated version (VER1) 30 (comprising numerous map files) stored on the hard disk HDD of the navigation apparatus, the pre-update map files needed to restore the nationwide updated version (VER1) are stored in a free area of the hard disk HDD. For example, a "-" is appended to the file names of the map files of the nationwide updated version (VER1) to create and store the pre-update map files as shown in (A) of FIG. 27 (S101), and then the map files are updated using route-specific the update data 32a (S102).

Then, when the above-described updated map data is to again be updated using the route-specific update data 32b, the previously updated map files are deleted from the map data updated by the route-specific update data 32a as shown in (B) of FIG. 27 (S103). The previously updated map files have the same file names as the pre-update map files stored with a "-" appended. Then, the "-" appended to the file names of the pre-update map files which have been stored is deleted, and the map data for the nationwide updated version (VER1) 30 is restored (S104). After restoration, the procedure explained in (A) of FIG. 27 is used to perform update processing. When map data which has once been updated is to be updated using nationwide update data 31, a similar procedure is used, so that after restoring the nationwide updated version (VER1) 30, the map data is updated to the new nationwide updated version map data (VER2) 35.

FIG. 28 explains the interface between a center server (update data creation device) and navigation apparatus, when differentially updating map data using route-specific update data for all routes newly opened between the time of release of the nationwide updated version map data (VER1) and a prescribed date. Upon a request for update data from the navigation apparatus, the center server displays on a display device of the navigation apparatus a "latest map confirmation screen", shown in (A) of FIG. 28, to specify the date until which update data is required. When the user selects a prescribed date at this screen, the center server displays the screen shown in (B) of FIG. 28, and upon selection of "YES" downloads the route-specific update data for the routes. If "NO" is selected, the "latest map confirmation screen" of (A) is again displayed.

However, when the latest nationwide updated version (VER2) is released, and thereafter prescribed route-specific update data is created, often the navigation apparatus must perform a nationwide update to the latest nationwide updated version (VER2) in the background while performing navigation control. In order for the user to acquire the prescribed route-specific update data and update the map data in the navigation apparatus in such background updating, after updating a nationwide updated version (VER1) to the latest nationwide updated version (VER2) as shown in (A) of FIG. 29, the route-specific update data 36 is used to update the nationwide updated version (VER2) to new maps (VER2+route A) 37, as shown in (B) of FIG. 29. However, before completing the nationwide update in this method, even if route-specific update data is acquired, if the nationwide update is not entirely completed, then the updated map data cannot be used with the route-specific update data. The nationwide update is performed through background updating (updating during free time when navigation control is not performed), but because this processing requires a number of hours of processing time, navigation control using map data which reflects the desired route-specific updates is delayed.

Further, there are cases in which map data which has once been updated using route-specific update data is to be updated to the latest nationwide updated version (VER2), or is to be updated using other route-specific update data. In such cases, as shown in (A) of FIG. 30, after returning the updated map data (VER1+route A) 33 to the nationwide updated version (VER1) 30, the nationwide update data 31 must be used to perform an update to the latest nationwide updated version (VER2) 35 ((B) in FIG. 30).

Or, as shown in (A) of FIG. 30, after returning the updated map data (VER1+route A) 33 to the nationwide updated version (VER1) 30, route-specific update data 32b must be used to update to updated map data (VER1+route A+route B) 34, as shown in (C) of FIG. 30. That is, when performing the next update after having performed a route-specific update, if the data is not first completely returned to the state of the nationwide updated version, the desired navigation control based on map data is not possible.

In one method of the prior art, when map information for navigation is updated, update data is downloaded immediately from an information provision center to a navigation apparatus or is installed (Japanese Patent Publication JP2004-12319A). In this method of the prior art, update data is provided to the navigation apparatus via communication, but route-specific update data is not used to update maps. In particular, navigation control cannot be performed while performing an update using desired route-specific data even when nationwide updating is not completed.

SUMMARY OF THE INVENTION

Based on the above, an object of the invention is to enable navigation control using the latest data, comprising route-specific updates, even when a nationwide update has not been completed.

A further object of the invention is, when performing the next route-specific update after a route-specific update, to enable the next route-specific update while returning to the nationwide updated version state, and to enable navigation control using the latest data.

First Map Data Update Method

A first map data update method of this invention is a map data update method of updating nationwide updated version map data using route-specific update data, as well as updating the nationwide updated version map data to the next nationwide updated version map data using nationwide update data, and has a step of performing map data updating in a background of navigation control, while giving priority to update processing using route-specific update data over update processing using nationwide update data, and a step, for map files updated using route-specific update files included in route-specific update data, of performing an update using nationwide update files included in the nationwide update data and then performing an update using the route-specific update files.

The first map data update method further comprises a step of checking whether map files used in navigation control have been updated using the route-specific update data; if not updated, a step of checking whether the map files have been updated using the nationwide update data; and, if not updated using the nationwide update data, a step of updating the map files using the nationwide update files, and then updating the map file using the route-specific update files; the updated map files are then used in navigation control.

The first map data update method further has a step of managing whether or not each map file has been updated using the route-specific update data, and of managing whether or not each map file has been updated using the nationwide update data. This step of managing whether updates have been performed has a step of acquiring, together with the update data, a serial number management file, in which are entered "valid" data in positions corresponding to new serial numbers added to map files to be updated using the update files; a step, each time a map file is updated using an update file, of adding the new serial number to the map file; and a step of checking whether a map file has been updated, by checking whether "valid" data has been entered at the serial number position of the map file.

As the serial number management file, a first serial number management file, used to check whether updating has been performed using the route-specific update files included in the route-specific update data, and a second serial number management file, used to check whether updating has been performed using the nationwide update files included in the nationwide update data, are comprised.

Second Map Data Update Method

A second map data update method of this invention is a map data update method of updating first nationwide updated version map data using first route-specific update data thereby first route-specific update map data generates, as well as updating the first nationwide updated version map data to a second nationwide updated version map data using nationwide update data, and has a step, when performing an update using second route-specific update data or using the nationwide update data after updating using the first route-specific update data, of returning the first route-specific map data for update to the first nationwide updated version map data and then performing an update using the second route-specific update data or the nationwide update data, in the background of navigation control; a step, performed in parallel with the update processing, of checking whether map files used by the navigation control have been updated using the second route-specific update data or using the nationwide update data; and a step, if updating has not been performed, of returning the map files to the first nationwide updated version map files, and then performing the update using the second route-specific update data or the nationwide update data.

The second map data update method further has a step, when using route-specific update data to update the first nationwide updated version map data stored in the navigation apparatus, of storing pre-update map files necessary to restore the first nationwide updated version map data, and a step, when using the second route-specific update data or the nationwide update data to perform an update, restoring the first nationwide updated version map files using the stored pre-update map files.

First Navigation Apparatus

A first navigation apparatus of this invention is a navigation apparatus which comprises update functions to use route-specific update data to update nationwide updated-version map data, and to use nationwide update data to update the nationwide updated version map data to the next nationwide updated version map data, and comprises a storage portion, which stores map data to be used in navigation control; a navigation control portion for performing navigation control; an update data input portion, for input of the route-specific update data and the nationwide update data; and, an update processing portion, which performs map updates in a background of the navigation control, and which gives priority to update processing using the route-specific update data over update processing using the nationwide update data, and for map files updated using route-specific update files to update map files included in the route-specific update data, which updates the map files using nationwide updated files included in the nationwide update data and then updates the map files using said route-specific update files.

If the map files to be used in navigation control by the navigation control portion have not been updated using the route-specific update data, the update processing portion checks whether the map files have been updated using nationwide update data, and if updating has not been performed, uses the nationwide update files to update the map files and then uses the route-specific update files to update the map files, and the navigation control portion uses the updated map files in navigation control.

The update data input portion inputs to the update processing portion, together with update data, a serial number management file in which are entered "valid" data at positions corresponding to new serial numbers assigned to map files to be updated using update files; the update processing portion checks whether the map files have been updated by checking whether "valid" data have been entered at the serial number positions of the map files. Serial number management file comprises a first serial number management file, used to check whether updating has been performed using the route-specific update files included in the route-specific update data, and a second serial number management file, used to check whether updating has been performed using the nationwide update files included in the nationwide update data.

Second Navigation Apparatus

A second navigation apparatus of this invention is a navigation apparatus which comprises update functions to update first nationwide updated-version map data using first route-specific update data, thereby first route-specific update map data generates and to update the first nationwide updated version map data to second nationwide updated version map data using nationwide update data, and comprises a first storage portion, which stores map data to be used in navigation control; a navigation control portion, which performs navigation control; an update data input portion, for input of route-specific update data and nationwide update data; and, an update processing portion, which, when using the second route-specific update data or nationwide update data to perform an update after updating using the first route-specific update data, performs updating using the second route-specific update data or the nationwide update data after returning the first route-specific update map data for updating to the first nationwide updated version map data in the background of navigation control, performs a check in parallel with said update processing to determine whether map files to be used in navigation control have been updated using the second route-specific update data or using the nationwide update data, and if the map files have not been updated, returns the map files to the first nationwide updated version map files, and then performs an update using the second route-specific update data or the nationwide update data.

The second navigation apparatus further comprises a second storage portion, which stores data necessary to restore the first nationwide updated version map data; when the route-specific update data is used to the first update nationwide updated version map data stored in the first storage portion, the update processing portion stores pre-update map files necessary to restore the first nationwide updated version map data in the second storage portion, and when after the update an update is to be performed using the second route-specific update data or nationwide update data, the pre-update map files thus stored are used to restore the first nationwide updated version map files.

By means of this invention, map updating is performed in the background of navigation control, and in addition update processing using route-specific update data is given priority over update processing using nationwide update data, and map files to be updated using route-specific update files included in the route-specific update data are updated after updating using the nationwide update data, so that even when whole nationwide updating is not completed, map files updated using the route-specific update data can be used to perform navigation control.

By means of this invention, map files for use in navigation control are checked to determine whether updating has been performed using route-specific update data, and if the files have not been updated, a check is performed to determine whether the map files have been updated using nationwide update data; if the map files have not been updated, then updating is performed using the nationwide update data, and then updating is performed using the route-specific update data, so that updated map files are used in navigation control. Hence updated map files can be used in navigation control.

By means of this invention, a serial number management file, in which are entered "valid" data at positions according to new serial numbers assigned to map files updated using the update files, is acquired together with the update data, and each time a map file is updated using an update file the new serial number is assigned to the map file, and a check is performed to determine whether the map file has been updated by checking whether "valid" data has been entered in the serial number position for the map file, so that it is possible to reliably judge whether updating has been performed.

By means of this invention, when, after updating using first route-specific update data, updating is then performed using second route-specific update data or using nationwide update data, map data for updating is returned to the first nationwide updated version map data and updating is then performed using the second route-specific update data or the nationwide update data in the background of navigation control, and in parallel with the above update processing a check is performed to determine whether map files to be used in navigation control have been updated using the second route-specific update data or the nationwide update data; if a map file has not been updated, then after returning the map file to the first nationwide updated version map file, updating is performed using the second route-specific update data or nationwide update data. Hence when after route-specific updating the next route updating is to be performed, or when after route-specific updating a nationwide updating is to be performed, the next route-specific updating or nationwide updating can be performed while returning the map files to the nationwide updated version state, and updated map data can be used to perform navigation control.

Other features and advantages of the present invention will be apparent from the following description, taken in conjunction with the accompanying drawings.

BRIEF DESCRIPTION OF THE DRAWINGS

FIG. 5 is a concept diagram of a second embodiment, for a case of performing the next updating (nationwide updating, route-specific updating) of a map file for which updating for route A has been performed;

FIG. 12 explains map data;

FIG. 13 explains map data;

FIG. 16 shows the configuration of a navigation apparatus;

FIG. 17 explains multitasking control of navigation processing and map update processing;

FIG. 20 explains update data creation processing by an update data creation device;

FIG. 22 explains update data;

FIG. 23 explains update data;

FIG. 24 explains update data;

FIG. 25 explains update data;

As many apparently widely different embodiments of the present invention can be made without departing from the spirit and scope thereof, it is to be understood that the invention is not limited to the specific embodiments thereof except as defined in the appended claims.

DESCRIPTION OF THE PREFERRED EMBODIMENTS (A) First Embodiment

Figure 1:
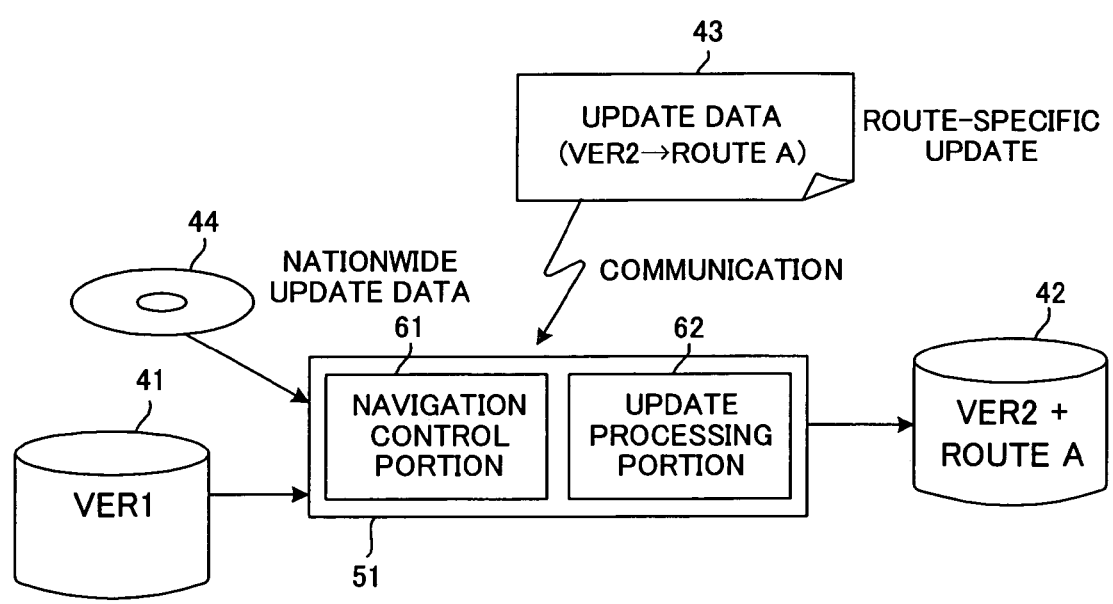
FIG. 1 is a concept diagram of a first embodiment of map updating (called compound updating), in which nationwide updating from a nationwide updated version (VER1) to a nationwide updated version (VER2), and route-specific updating-using route-specific update data, are performed together.

FIG. 1 is a concept diagram of a first embodiment of map updating (called compound updating), in which nationwide updating from a nationwide updated version (VER1) 41 to a nationwide updated version (VER2) 42, and route-specific updating using route-specific update data, are performed together.

The update processing portion 62 of the navigation apparatus 51 performs compound update processing in the background of navigation control, using route-specific update data 43 and nationwide update data 44, and in addition gives priority to update processing using the route-specific update data 43 over update processing using the nationwide update data 44. Updates of map files of the nationwide updated version (VER2) 42 updated using route-specific update files included in the route-specific update data 43 are performed by updating at first the VER1 map files to VER2 map files using the update files of nationwide update data 44, and then updating the VER2 map files using route-specific update files.

Figure 2:
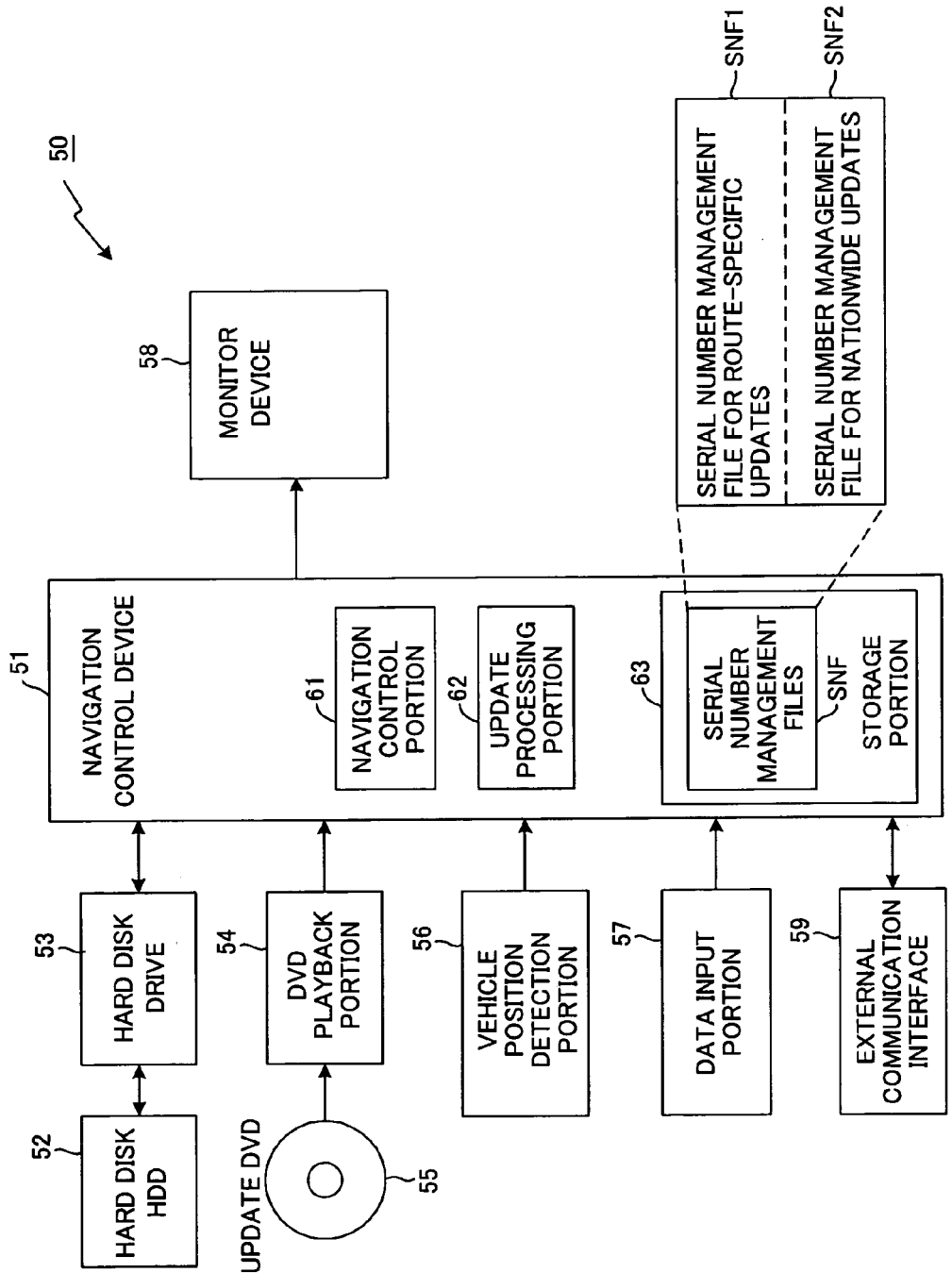
FIG. 2 shows the configuration of the navigation apparatus of the first embodiment.

FIG. 2 shows the configuration of the navigation apparatus of the first embodiment; the navigation control device 51 comprises a navigation control portion 61 which performs navigation control processing, an update processing portion 62 which performs map update processing, and a storage portion 63 which stores serial number management files SNF.

A serial number management file SNF stores the contents explained in FIG. 20, and by referencing this serial number management file SNF, it is possible to judge whether a map file has been updated or not. A serial number management file SNF includes a serial number management file SNF1 for route-specific updates and a serial number management file SNF2 for nationwide updates; the serial number management file SNF1 for route-specific updates is input together with route-specific update data to the navigation control device 51, and the serial number management file SNF2 for nationwide updates is input together with nationwide update data to the navigation control device 51.

Map data for use in navigation is stored, in a file format, on the hard disk (HDD) 52, and the hard disk drive 53 reads map data from the hard disk 52 according to instructions from the navigation control device 51, and writes map data to the hard disk.

The DVD playback portion 54 reads nationwide update data 41 for nationwide updates and the serial number management file SNF2 from the update DVD 55, and inputs the data to the navigation control device 51. The serial number management file SNF2 is created simultaneously with creation of nationwide update data 41, as explained in FIG. 20.

The vehicle position detection portion 56 detects the vehicle position and inputs the position to the navigation control device 51. By this means the navigation control portion 61 can use map data to perform navigation control. The data input portion 57 is a touchscreen, remote control or similar, used to input various commands and data; the monitor device 58 displays various screens for navigation and for map update processing.

The communication interface 59 communicates with an external server device via a portable telephone, the Internet or other means, receives route-specific update data 43 and a serial number management file SNF1 for route-specific updates from the external server device, and inputs this data to the navigation control device 51. As explained in FIG. 20, the serial number management file SNF1 is created simultaneously with creation of route-specific update data 43. A configuration is also possible in which nationwide update data 44 and the serial number management file SNF2 for nationwide updates are received from the external server device.

Figure 3:
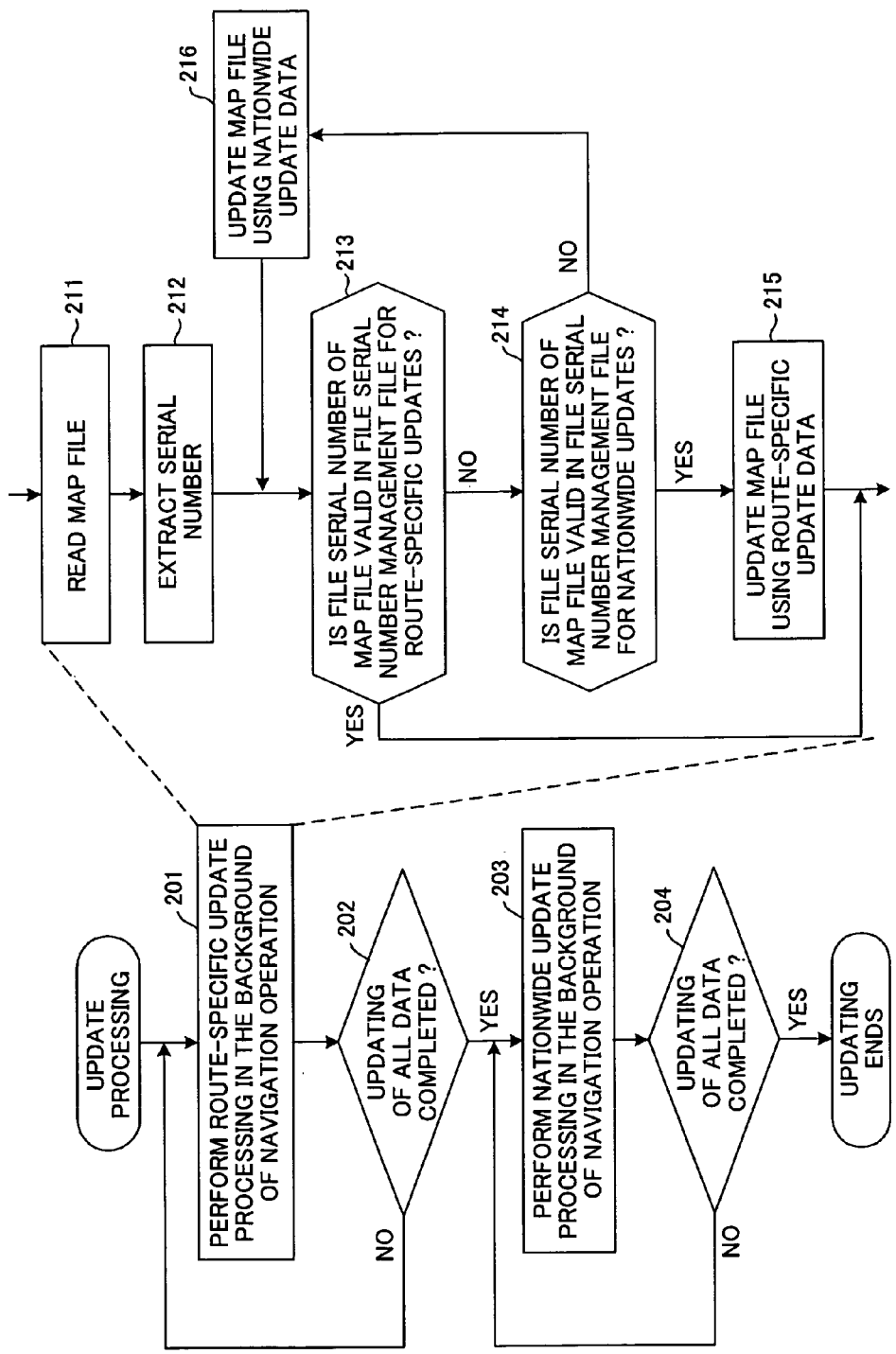
FIG. 3 shows the flow of processing to perform map updating in the background of navigation control.
Figure 4:
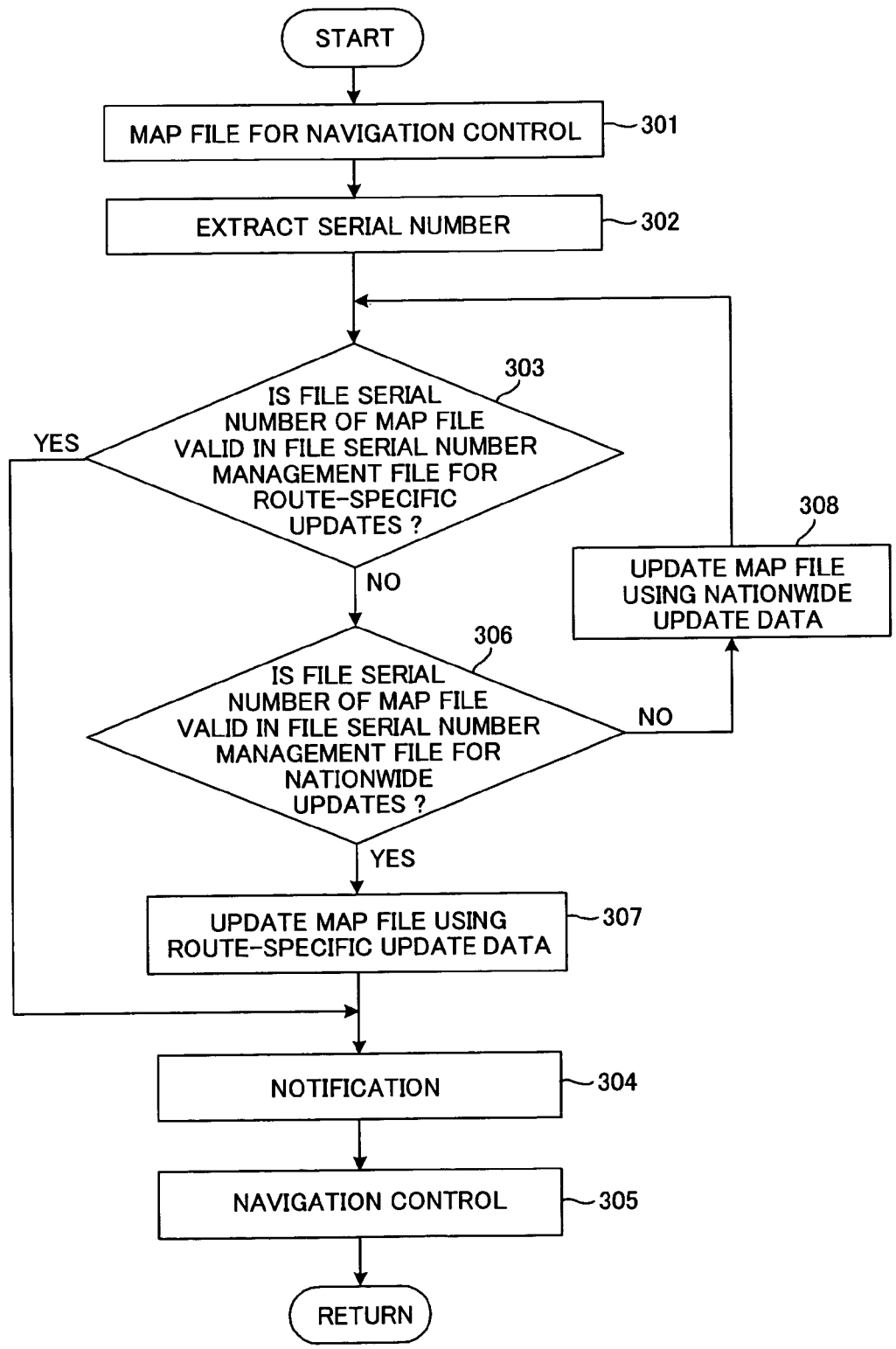
FIG. 4 shows the flow of on-demand update processing to perform on-demand updating of map files used in navigation control.

FIG. 3 shows the flow of processing to perform map updates in the background of navigation control, and FIG. 4 shows the flow of on-demand update processing to perform on-demand updates of map files used in navigation control.

The update processing portion 62 performs map updates in the background of navigation control, and also gives priority to update processing using route-specific update data over update processing using nationwide update data. That is, the update processing portion 62 performs route-specific update processing, based on route-specific update data, in free time during which navigation control is not performed (step 201). Each time a map file is updated based on an update file of route-specific update data, a check is performed to determine whether route-specific updating is complete (step 202); if updating is not complete, route-specific updating is continued and route-specific updating is performed in step 201.

When route-specific updating is complete, the update processing portion 62 performs nationwide update processing, based on nationwide update data, in free time during which navigation control is not performed (step 203). Each time a map file is updated based on an update file of nationwide update data, a check is performed to determine whether nationwide updating is complete (step 204); if updating is not complete, nationwide updating is continued and nationwide updating is performed in step 203.

In the route-specific update processing of step 201, the update processing portion 62 reads a map file to be updated by an route-specific update file from the hard disk 52 (step 211), extracts the serial number from the map file (step 212), refer to the serial number management file SNF1 for route-specific updates, checks whether a "valid" bit is written to the serial number position of the map file (whether the file has been updated) (step 213), and if the bit is "valid", performs the processing of step 202.

If in step 213 the bit is "invalid" (not yet updated), the serial number management file SNF2 for nationwide updates is referred to, and a check is performed to determine whether the serial number position for the map file is set to "valid" (nationwide update completed) (step 214); if the bit is "valid", the route-specific update file of the route-specific update data is used to update the map file, and in addition a new serial number held by the route-specific update file is assigned to the new map file (step 215), and the processing of step 201 is performed. This new serial number position is set to "valid" in the serial number management file SNF1.

On the other hand, if in step 214 the bit is not "valid" and nationwide updating has not been performed, a nationwide update file of the nationwide update data is used to update the map file (step 216), after which the processing of step 213 and below is performed; in step 215 the route-specific update file of the route-specific update data is used to update the map file, and the processing of step 201 is performed. In step 216, a new serial number for nationwide updating is assigned to the map file after nationwide updating. This new serial number position is set to "valid" in the serial number management file SNF2.

In the on-demand update processing flow of FIG. 4, the navigation control portion 61 reads a map file to be used in navigation control from the hard disk 52 (step 301), and extracts the serial number for the map file (step 302).

The update processing portion 62 refers to the serial number management file SNF1 for route-specific updates, checks whether the serial number position for the map file is set to "valid" (update completed) (step 303), and if valid, notifies the navigation control portion 61 of this fact (step 304), as a result of which the navigation control portion 61 performs navigation control based on the map file read in step 301 (step 305).

If on the other hand the setting in step 303 is "invalid" (update not completed), the serial number management file SNF2 for nationwide updates is referred to, and a check is performed to determine whether the serial number position for the map file is set to "valid" (nationwide update completed) (step 306); if "valid", the map file is updated using a route-specific update file of the route-specific update data, and in addition a new serial number, held by the route-specific update file, is assigned to the new map file (step 307), and the navigation control portion 61 is notified of the updating (step 304). As a result of this notification, the navigation control portion 62 uses the updated map file to execute navigation control (step 305). In step 307, the new serial number position assigned to the map file is set to valid in the serial number management file SNF1 for route-specific updates.

On the other hand, if in step 306 the setting is not "valid" and a nationwide update has not been performed, the map file is updated using a nationwide update file of the nationwide update data (step 308), after which the processing of step 303 and below is performed, and in step 307 the map file is updated using a route-specific update file of the route-specific update data, and the navigation control portion 61 is notified of the update (step 304). In step 308, a new serial number for nationwide updating is assigned to the map file after nationwide updating. This new serial number position is set to "valid" in the serial number management file SNF2 for nationwide updates.

In the first embodiment, on-demand update processing is performed where necessary during navigation control processing; the background update processing of FIG. 4 is performed during free time from the above processing.

In FIG. 3, the reasons for first performing a route-specific update are:

(1) During compound updating, performance is not good compared with simple updating, and so compound updating should be ended rapidly; and, (2) Route-specific updating is performed for routes selected by the user, and so the possibility of actual use is higher than for other data, and there is a need to rapidly enable use of the route data.

The flow in FIG. 3 and FIG. 4 is for cases in which nationwide updates and route-specific updates are requested simultaneously, but can also be applied to cases in which a route-specific update is requested during a nationwide update.

By means of the first embodiment, even when a nationwide update is not completed, on-demand updates of map files can be performed using route-specific update data, and the updated map data can be used in navigation control.

(B) Second Embodiment

FIG. 5 is a concept diagram of a second embodiment, for a case of performing the next updating (nationwide updating, route-specific updating) of a map for which updating for a route(referred to as a route A) has been performed; (A) is a case in which a map updated for route A is to be updated for routes referred to as routes A+B, and (B) is a case in which a map updated for route A is to undergo a nationwide update.

In (A) of FIG. 5, when map data 41 updated for route A is to be updated for routes A+B, the update processing portion 62, in the background of navigation control, returns the map data updated for route A (VER1+route A) 41 to the nationwide updated version (VER1), and after returning the map data to the nationwide updated version, uses update data for routes (A+B) 43 to update to the map data 42. In the above updating, a check is performed to determine whether map files necessary for navigation control have been updated using the route-specific update data 43; if a map file has not been updated, the map file is immediately returned to the map file of the nationwide updated version VER1, and is then updated using the route-specific update data 43 (on-demand updating) so that the navigation control portion 61 can use the updated map file in navigation control.

In (B) of FIG. 5, when map data 41 updated for route A is to undergo nationwide updating, the update processing portion 62 returns map data (VER1+route A) 41 which has been updated for route A in the background of navigation control to the nationwide updated version (VER1), and after returning to the nationwide updated version, performs nationwide updating to the nationwide updated version VER2. During the above updating, a check is performed to determine whether map files necessary for navigation control have been updated using nationwide update data 44, and if updating has not been performed for a file, the map file is immediately returned to the map file for the nationwide updated version VER1, and is then updated using the nationwide update data 44, so that the navigation control portion 61 can use this updated map file in navigation control.

Figure 6:
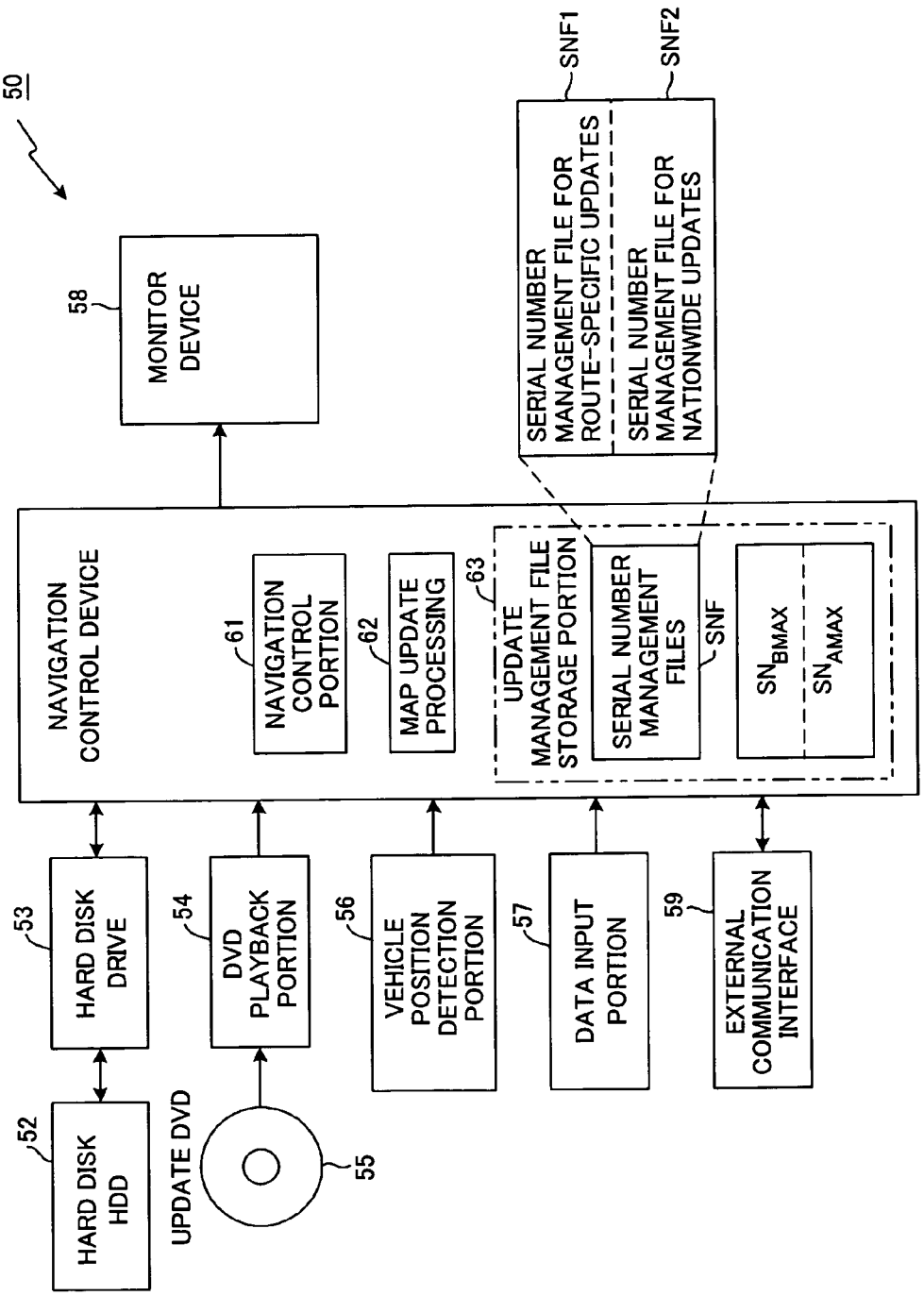
FIG. 6 shows the configuration of the navigation apparatus of the second embodiment.

FIG. 6 shows the configuration of the navigation apparatus of the second embodiment; portions which are the same as in the navigation apparatus of the first embodiment in FIG. 2 are assigned the same symbols. Points of difference are that update management files are input together with update data, where the update management files comprise (1) serial number management files SNF1 and SNF2, and (2) the maximum serial number $SN_{BMAX}$ prior to update data creation and the maximum serial number $SN_{AMAX}$ after update data creation, and that these are stored in the storage portion (update management file storage portion) 63.

The maximum serial number $SN_{BMAX}$ prior to update data creation and maximum serial number $SN_{AMAX}$ after update data creation are used to check whether a map file has been updated using previous update data for route A; if the serial number SN of a map file read from the hard disk 52 is such that $$SN_{BMAX} < SN \leq SN_{AMAX} \qquad (1)$$

then the map file has been updated using the previous update data for route A; if the above equation does not obtain, then the map file is judged not to have been updated using the previous update data for route A.

Figure 7:
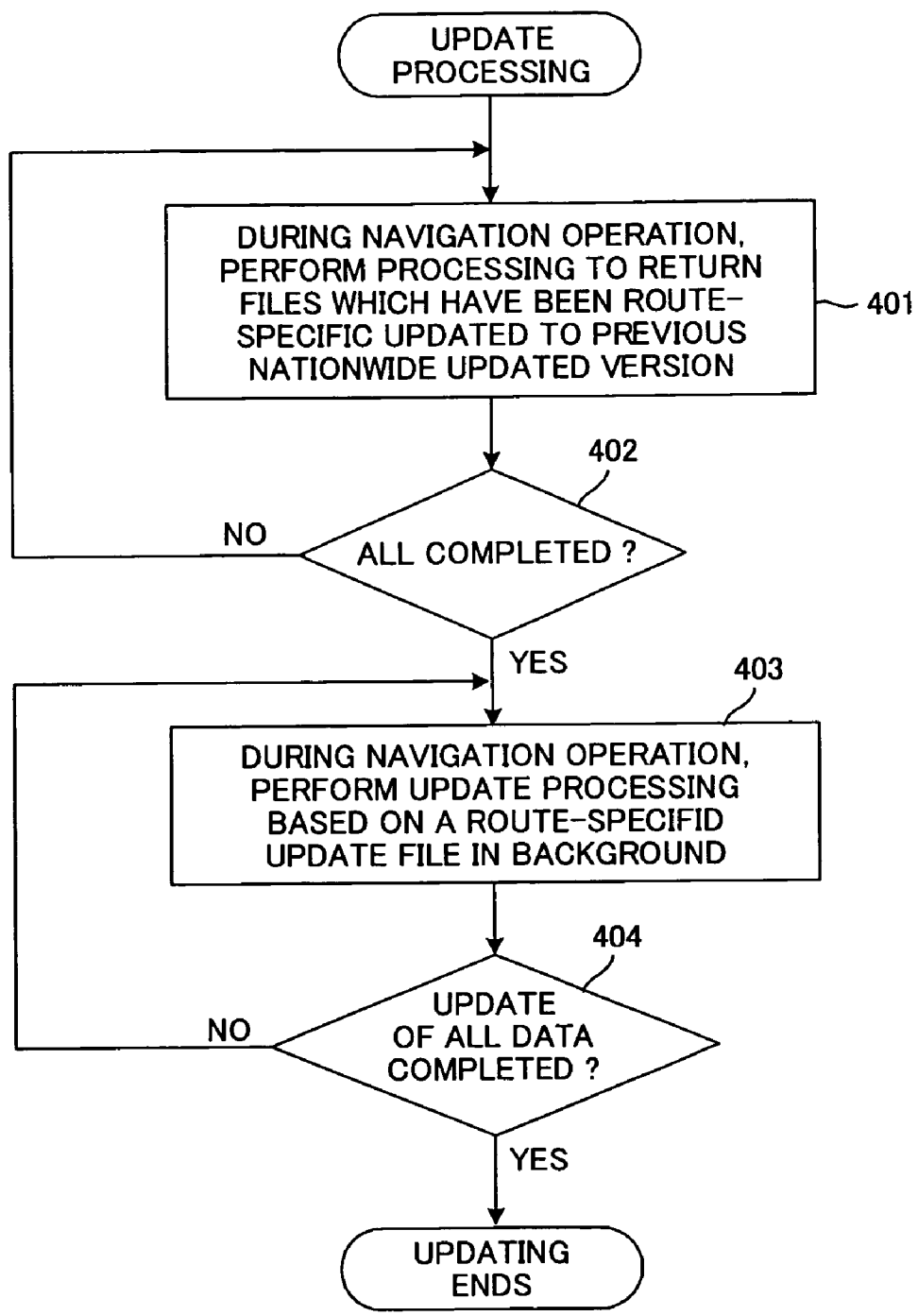
FIG. 7 shows the flow of processing to perform map updating in the background of navigation control in the second embodiment.
Figure 8:
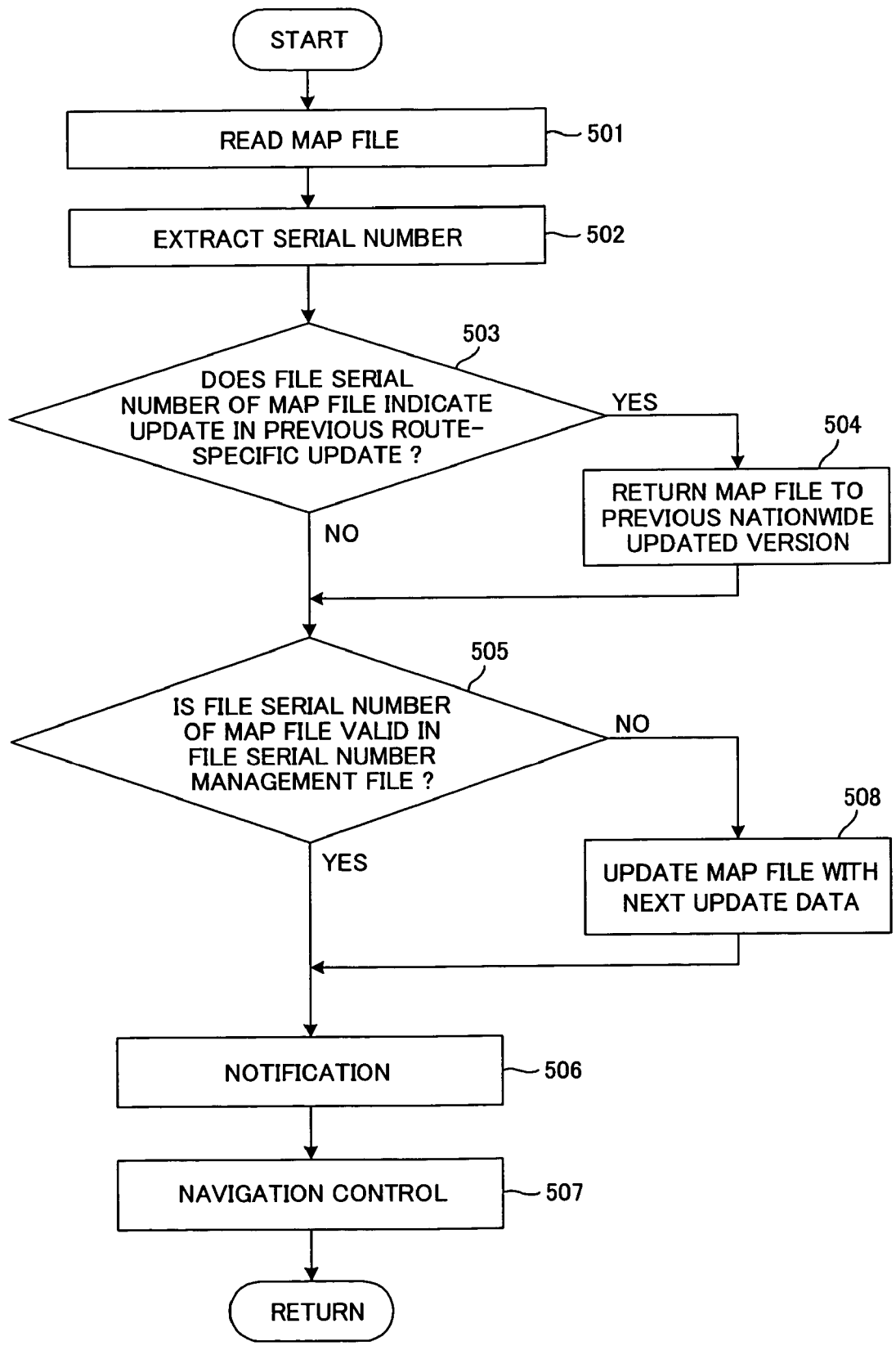
FIG. 8 shows the flow of on-demand update processing to perform on-demand updating of map files used in navigation control.
Figure 9:
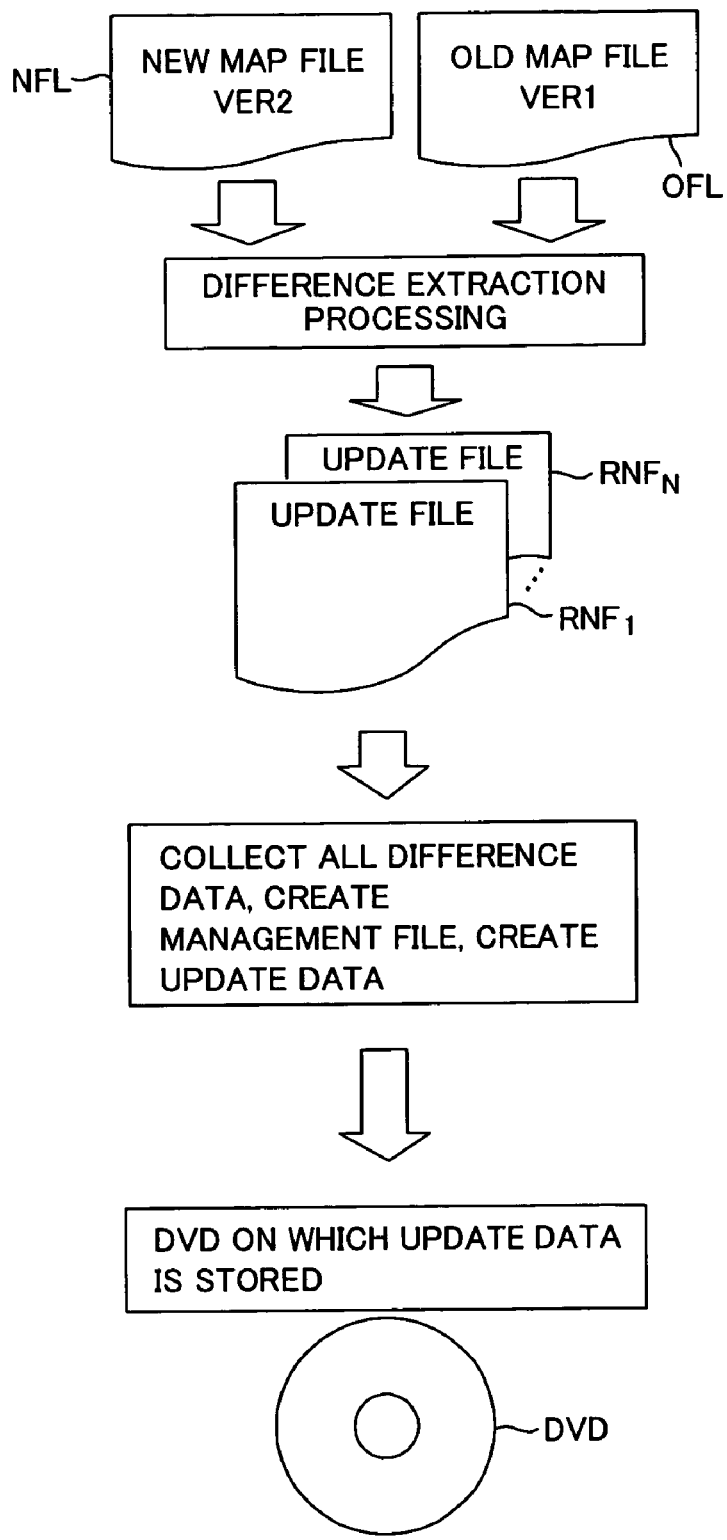
FIG. 9 is a summary explanatory diagram of creation of an update DVD by an update data creation device.
Figure 10:
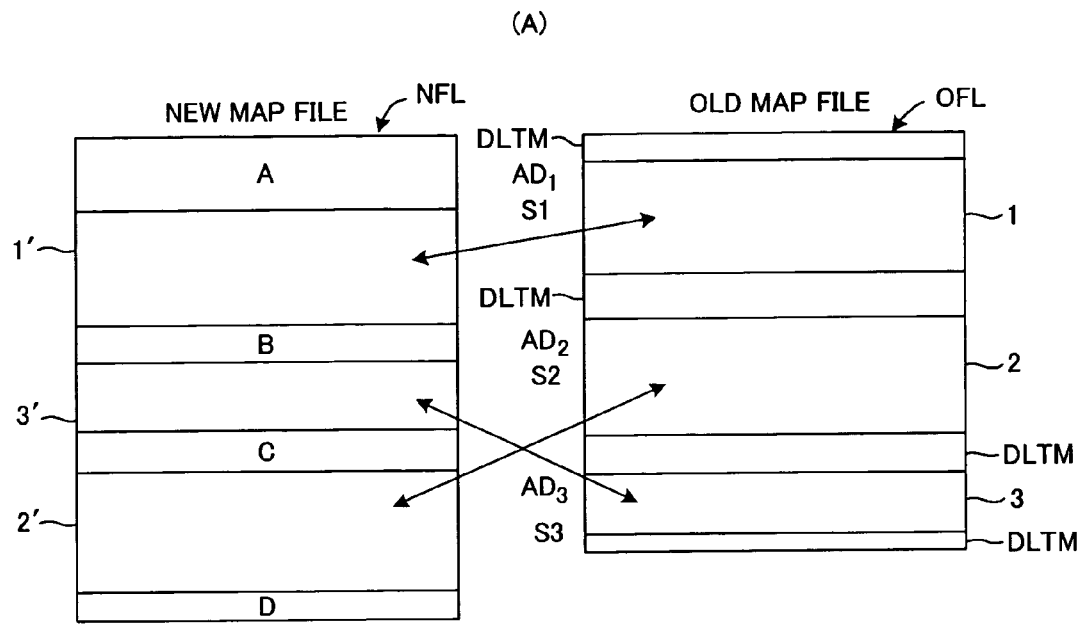
FIG. 10 is an explanatory diagram of a method of creation of difference data files (update files) by file.
Figure 11:
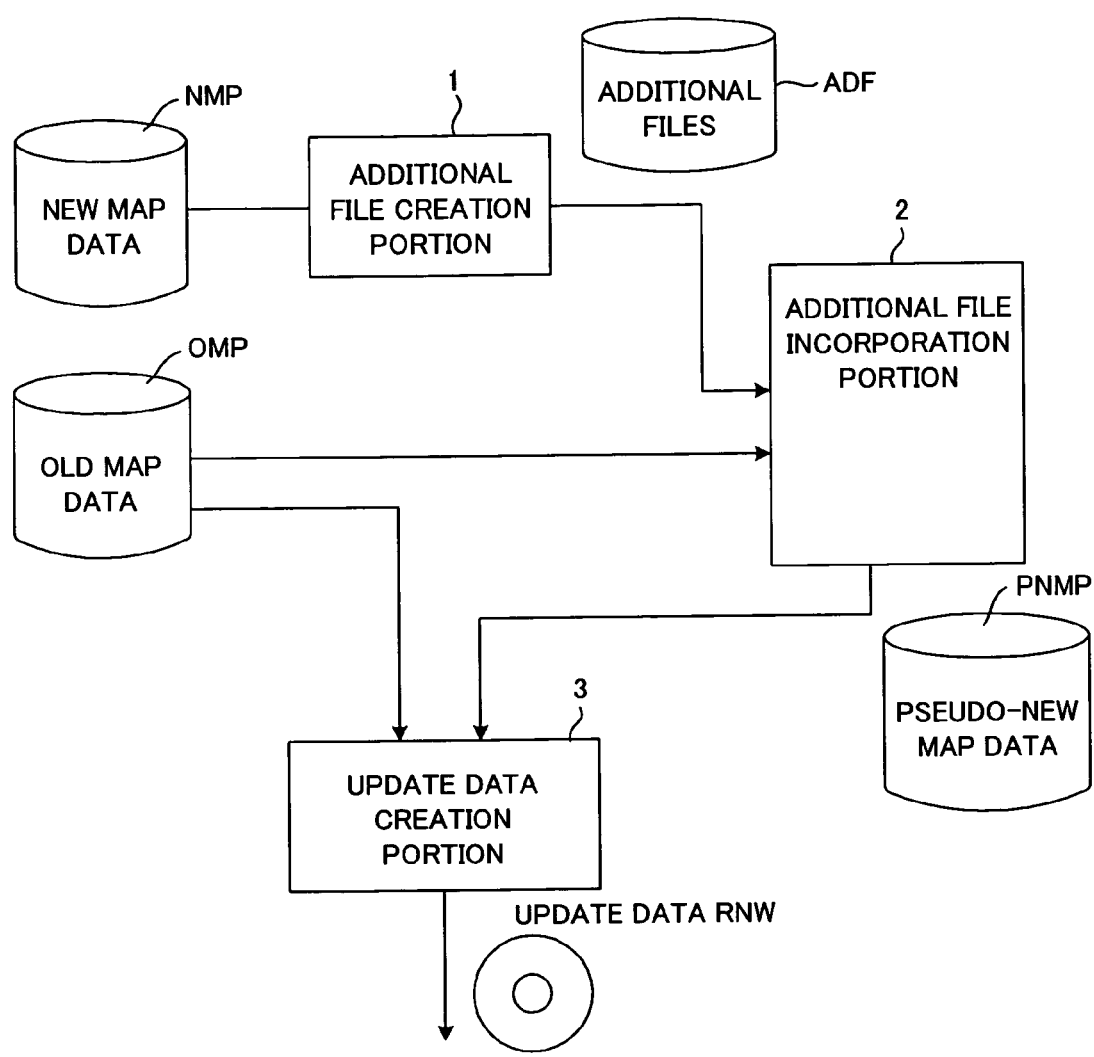
FIG. 11 explains a principle of update data creation.
Figure 14:
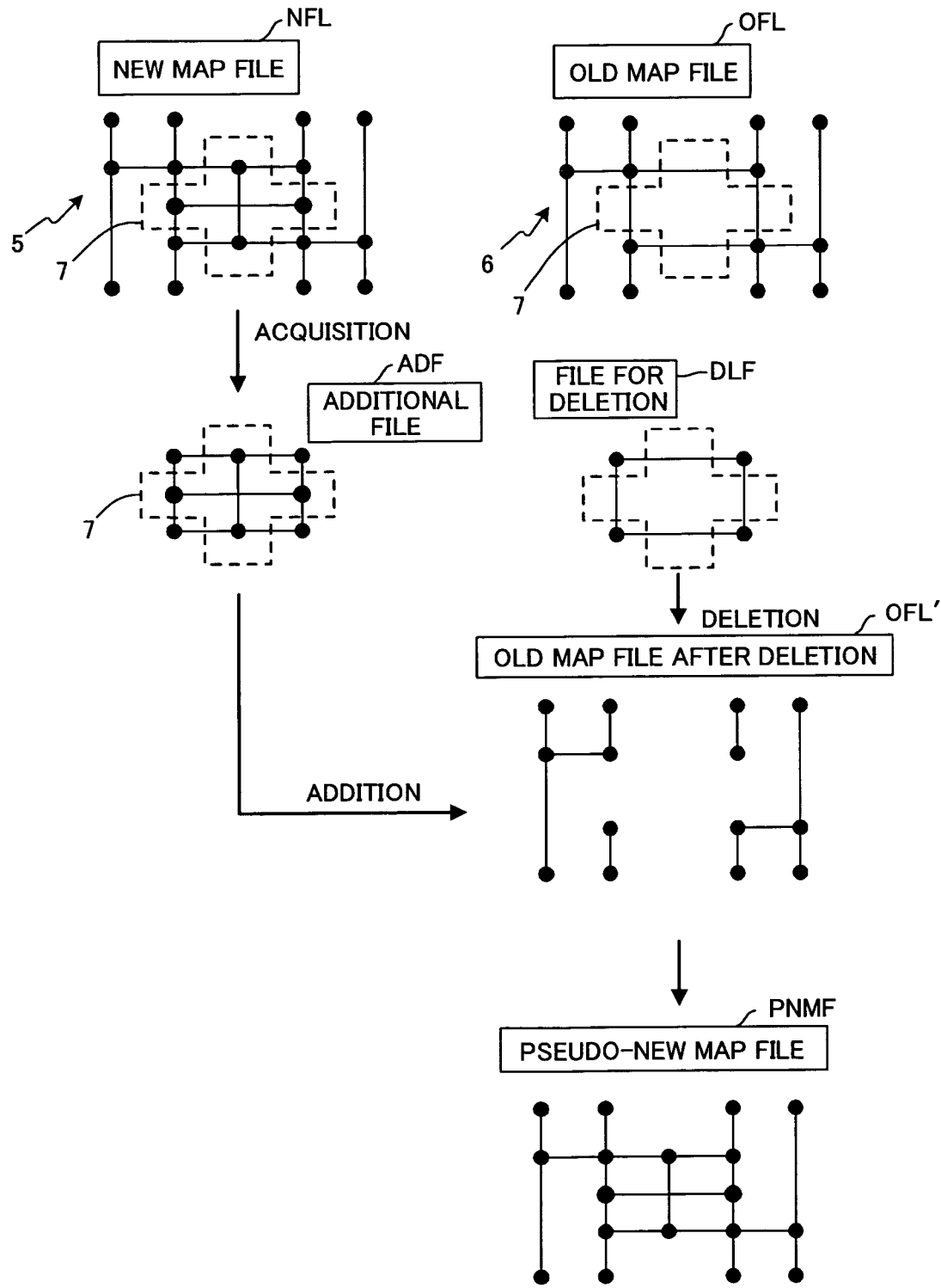
FIG. 14 explains creation of an additional file ADF identifying road addition locations for addition to old map data, and a method of incorporation.
Figure 15:
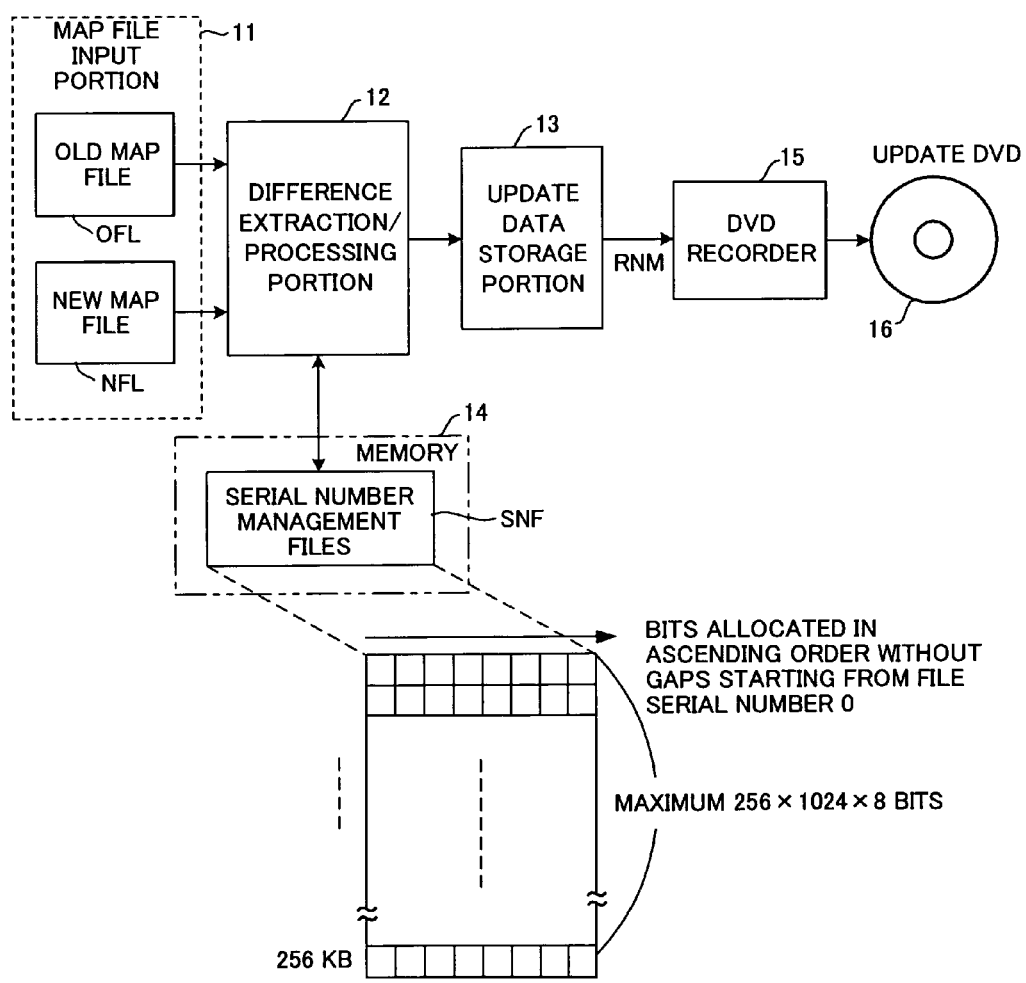
FIG. 15 shows the configuration of an update data creation device.
Figure 18:
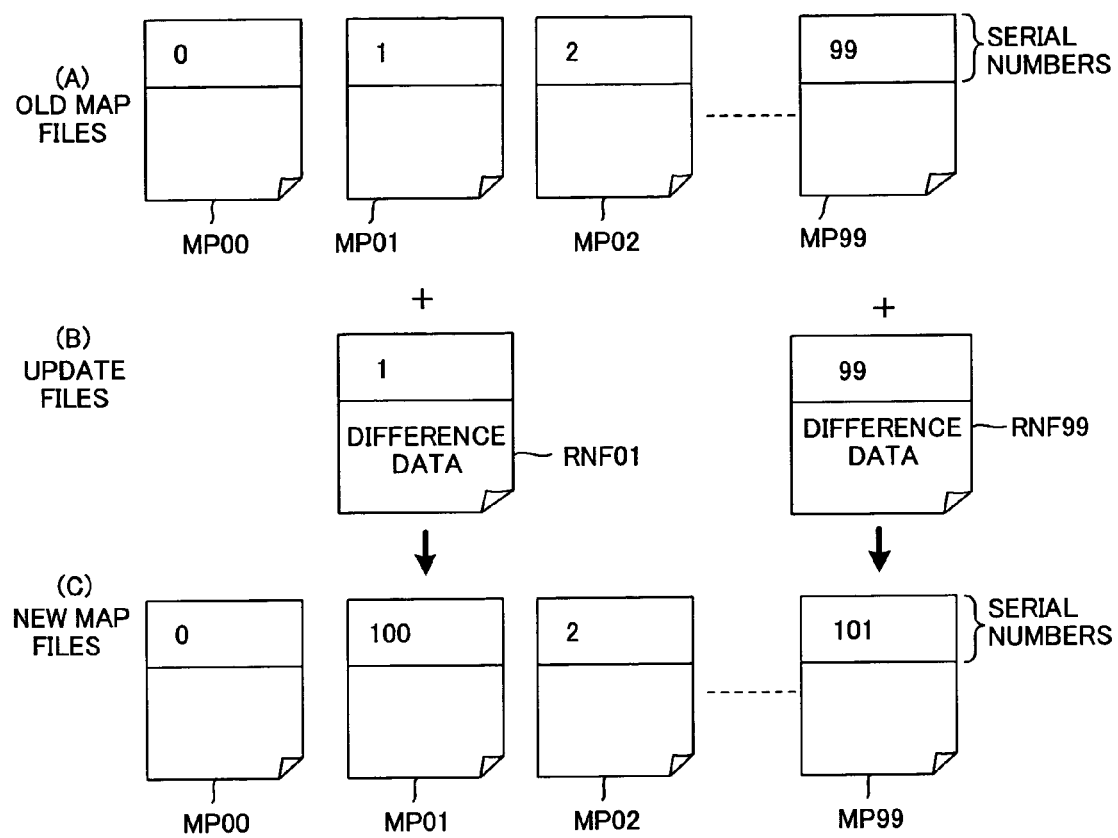
FIG. 18 explains map file serial numbers.
Figure 19:
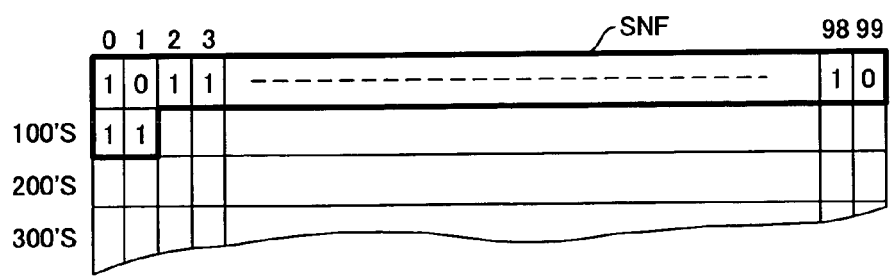
FIG. 19 explains serial number management files SNF created by an update data creation device.
Figure 21:
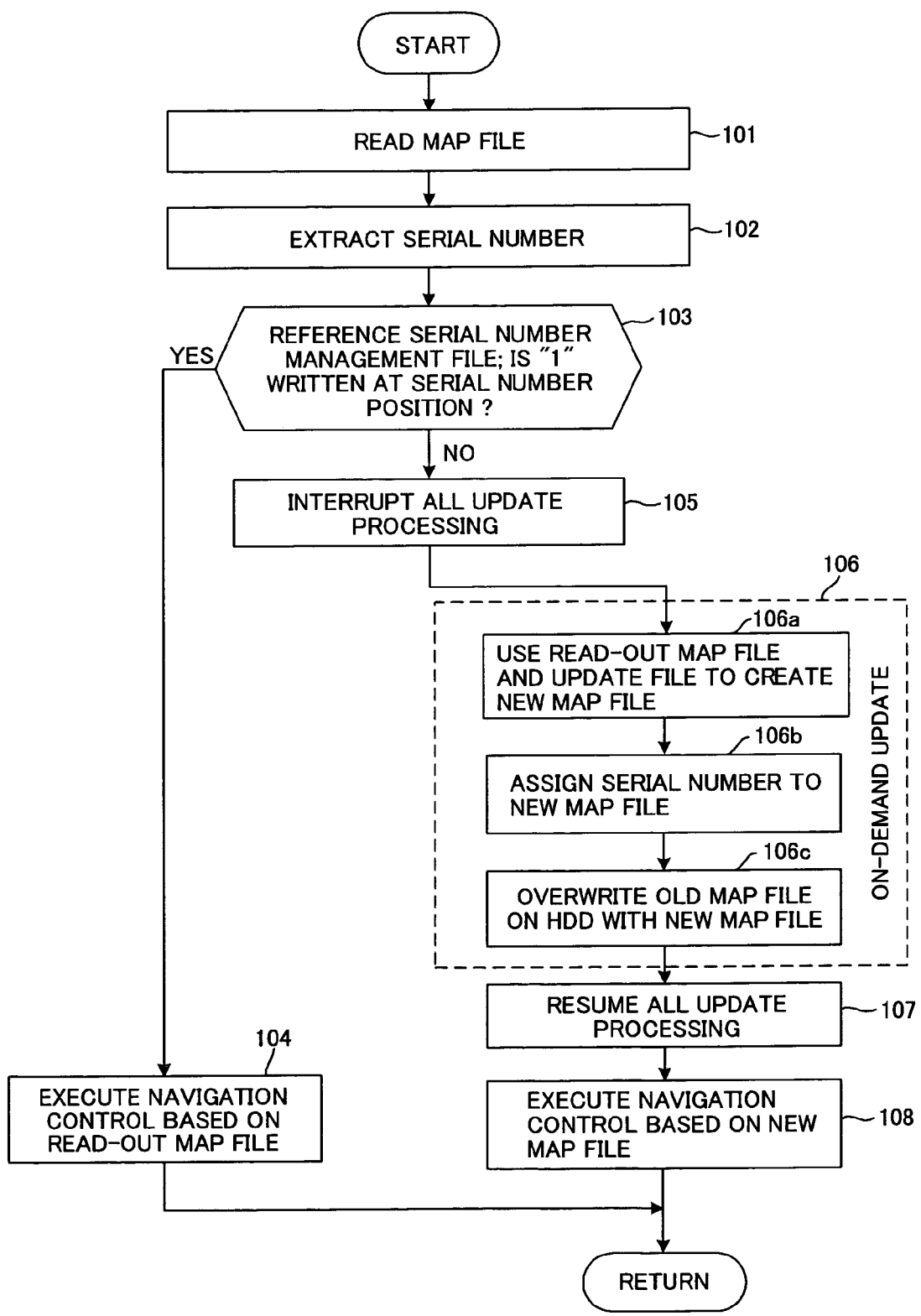
FIG. 21 shows the flow of background update processing.
Figure 26:
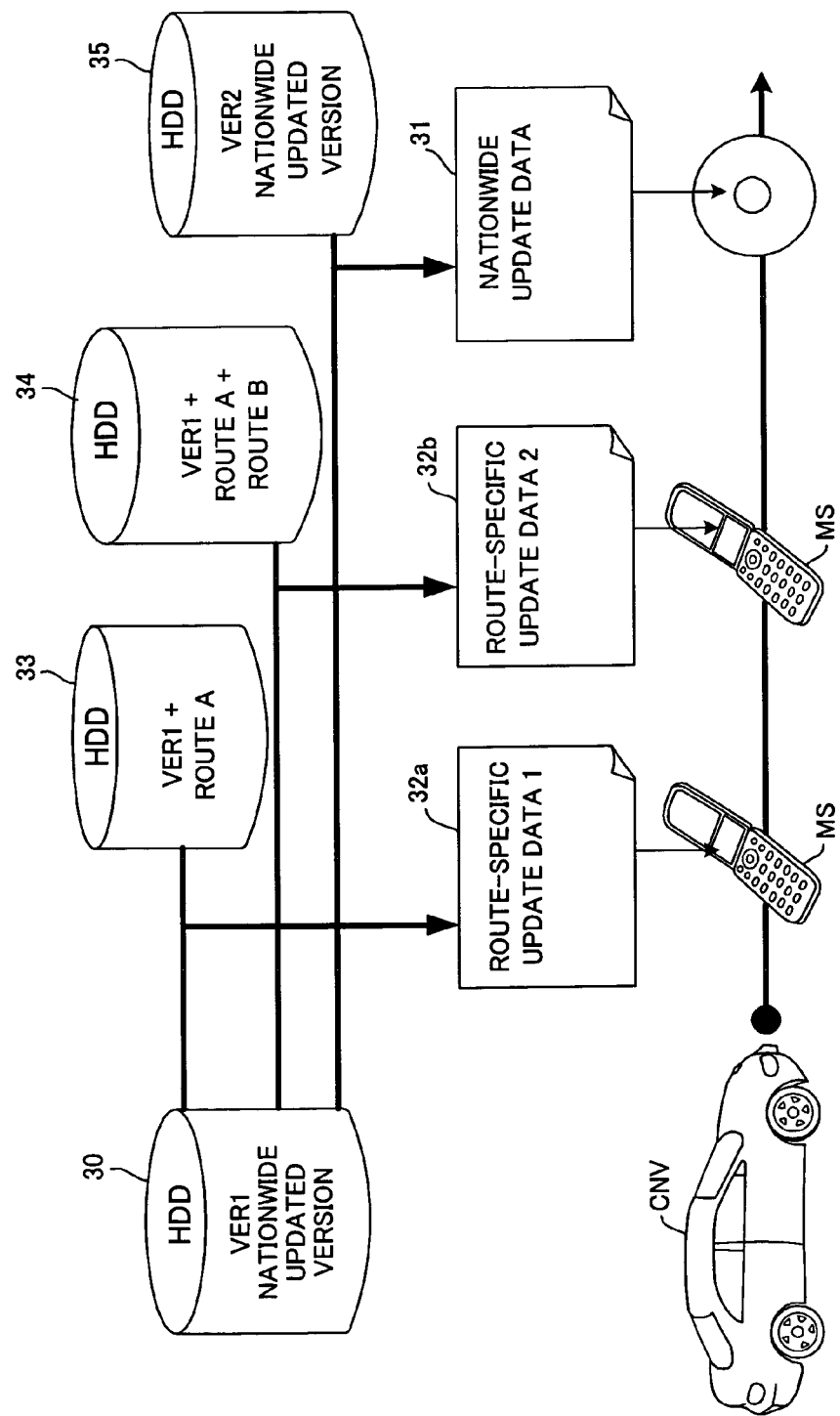
FIG. 26 is a summary explanatory diagram of operation for map updating.

FIG. 7 shows the flow of processing to perform map updating in the background of navigation control in the second embodiment, and FIG. 8 shows the flow of on-demand update processing to perform on-demand updating of map files used in navigation control.

Figure 27:
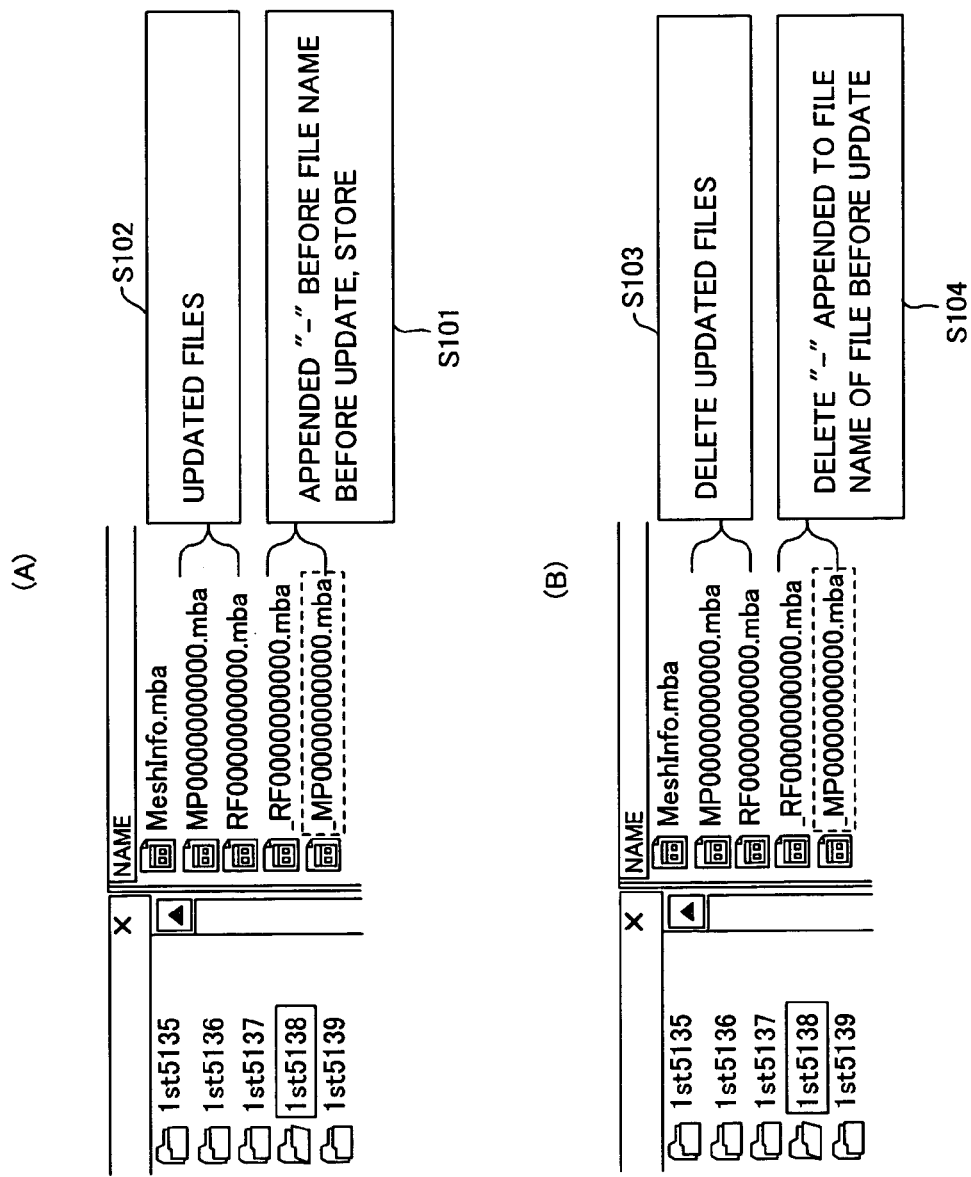
FIG. 27 explains map update processing by a navigation apparatus.
Figure 28:
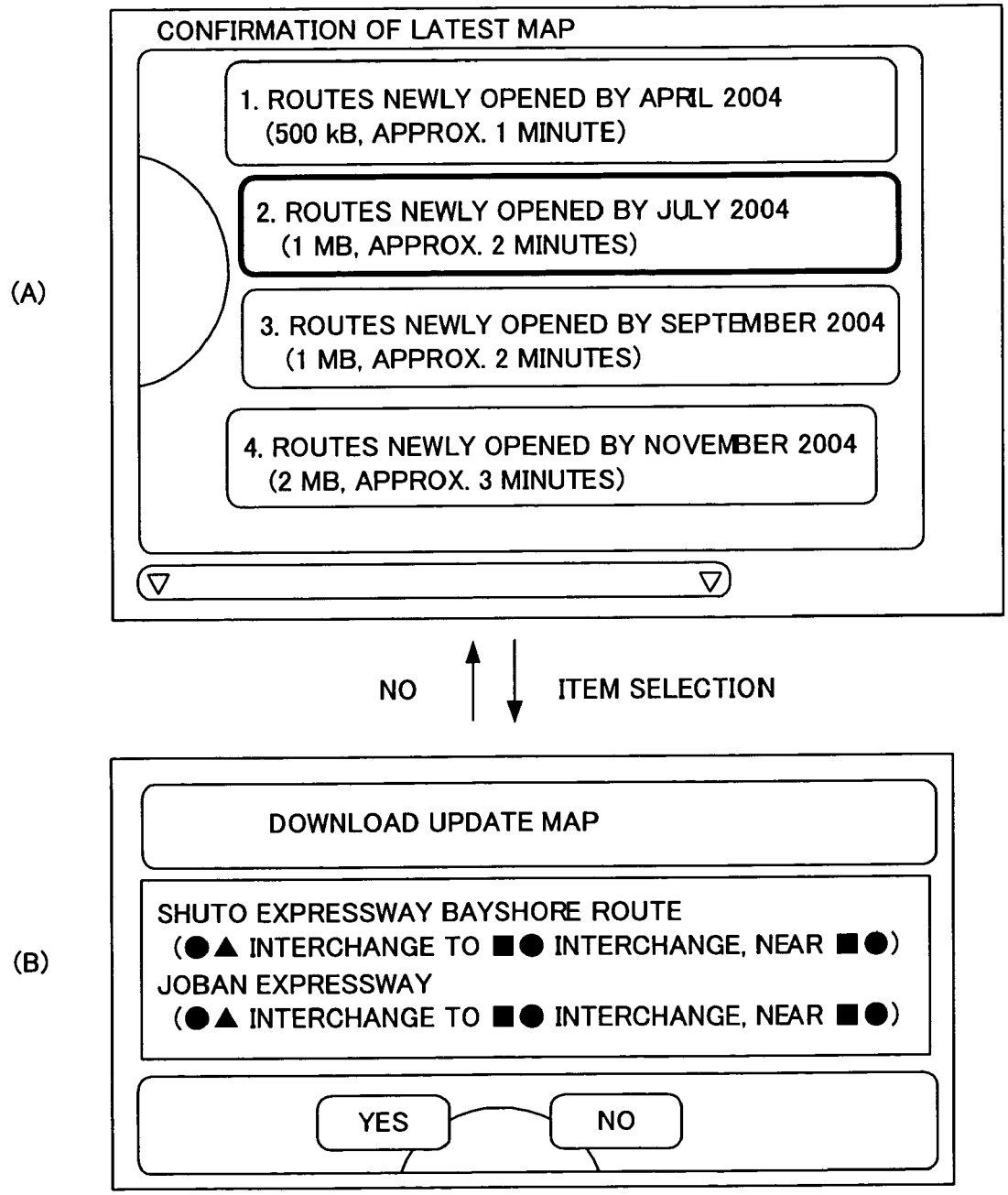
FIG. 28 explains an interface between a center server (update data creation device) and a navigation apparatus, for a case in which map data is differentially updated using update data for all routes newly opened between the time of release of nationwide updated version maps and a prescribed date.
Figure 29:
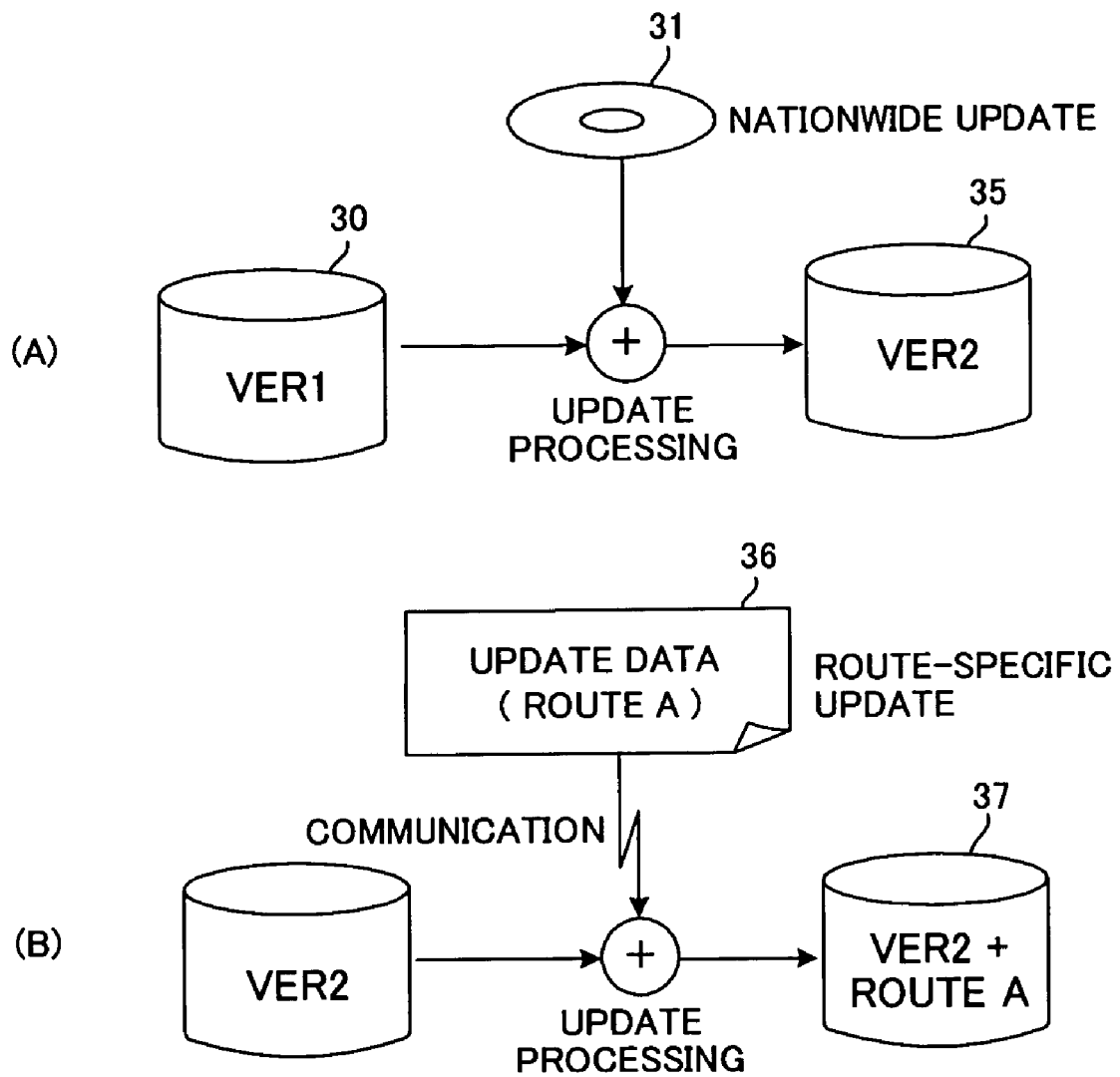
FIG. 29 explains route-specific updating performed after updating a nationwide updated version (VER1) to the latest nationwide updated version (VER2); and, FIG. 30 explains a case in which map data which has once been updated using route-specific update data is updated to the latest nationwide updated version (VER2), or is updated using other route-specific update data.
Figure 30:
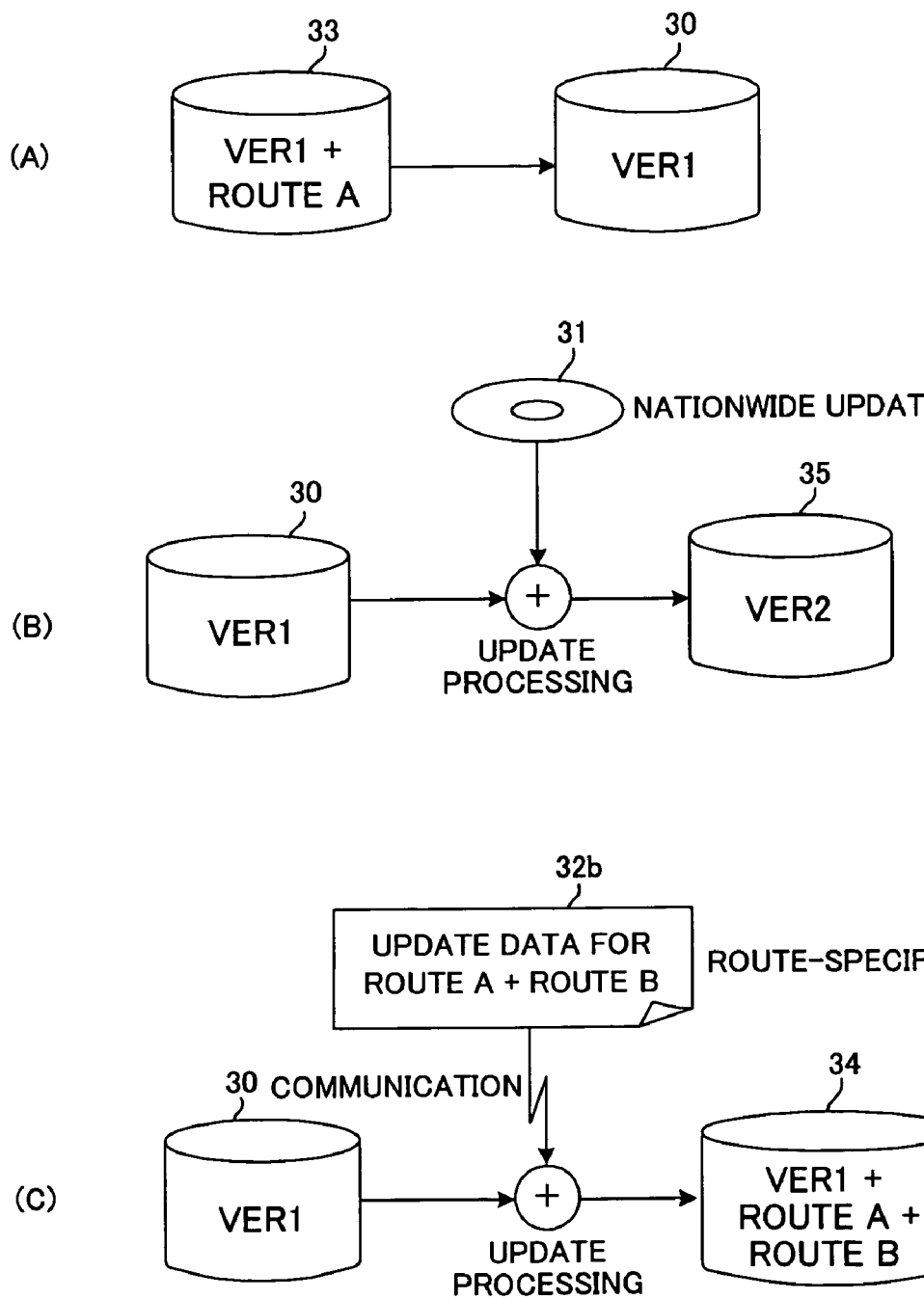

The update processing portion 62 performs map updating in the background of the navigation control. That is, during free time when navigation control is not being performed, the update processing portion 62 reads map data stored on the hard disk 52, searches for map files which have been updated in the previous updating for route A based on equation (1), and uses the method explained in FIG. 27 to return these map files to map files for the nationwide updated version VER1 (steps 401 and 402).

When processing to return the previously updated map data 41 to the nationwide version VER1 has been completed, route-specific update processing is performed based on route-specific update data 43 for routes A+B (step 403). Each time a map file is updated based on a route-specific update file of the route-specific update data, a check is performed to determine whether route-specific updating has been completed (step 404), and if updating has not been completed, update processing is continued.

In the flow of on-demand update processing in FIG. 8, the navigation control portion 61 reads a map file for use in navigation control from the hard disk 52 (step 501), and extracts the serial number for the map file (step 502). Then, a check is performed based on equation (1) to determine whether the map file has been updated in a previous update for route A (step 503), and if the map file has been updated, and the processing of FIG. 7 has not been performed to return the map file to the map file of the nationwide updated version VER1, the map file is returned to the map file of the nationwide updated version VER1 (step 504).

In step 503, if the map file has not been updated in the previous update for route A, or if processing to return to the map file of the nationwide updated version VER1 in step 504 has ended, the update processing portion 62 refers to the serial number management file SNF1 for route-specific updates and checks whether the serial number position for the map file is set to "valid" (updated) (step 505), and if "valid", notifies the navigation control portion 61 of this fact (step 506); by this means, the navigation control portion 61 can perform navigation control based on the map file read in step 501 (step 507).

If on the other hand the setting is "invalid" (not updated) in step 505, the route-specific update file of the route-specific update data is used to perform a map update, and a new serial number held by the route-specific update file is assigned to the new map file (step 508), and the navigation control portion 61 is notified of the update (step 506). By means of this notification, the navigation control portion 61 can use the updated map file to execute navigation control (step 507). The new serial number position assigned to the map file in step 508 is set to "valid" in the serial number management file SNF1 for route-specific updates.

In the second embodiment, the on-demand update processing of FIG. 8 is performed during navigation control processing as necessary, and the background update processing of FIG. 7 is performed during the free time when the above processing is not being performed.

In FIG. 7 and FIG. 8, the flow of processing for the case of (A) in FIG. 5 was shown; the flow of processing for the case of (B) in FIG. 5 is similar. In the above, a judgment was made as to whether a map file was updated using the previous update data for route A based on equation (1); but the judgment can be made by other methods. For example, data F indicating the processing state (whether a file of interest has been processed) is entered in the differential update information record shown in FIG. 25; this data can also be used to judge whether a map file was updated using the previous update data for route A.

By means of the second embodiment, when after route-specific updating the next route-specific update or a nationwide update is to be performed, it is possible to return to the state of the nationwide updated version while performing the next route-specific update or the update to the new nationwide updated version.

What is claimed is:

1. A map data update method of updating nationwide updated version map data to next nationwide updated version map data using nationwide update data and of updating the next nationwide updated version map data using route-specific update data, comprising:
   a first step of performing map data updating in a background of navigation control in which map data is comprised of a plurality of map files, and giving priority to update processing using the route-specific update data over update processing using the nationwide update data; and
   a second step of, for map files updated using route-specific update files included in the route-specific update data, performing an update at first using nationwide update files included in the nationwide update data and then performing an update using the route-specific update files, wherein
   said second step includes sub-steps of:
   checking whether map files used in the navigation control have been updated using the route-specific update data;
   if not updated, checking whether the map files have been updated using the nationwide update files included in the nationwide update data; and
   if not updated, updating the map files using the nationwide update files included in the nationwide update data, and then updating the map files using the route-specific update files, and
   the updated map files are then used in the navigation control.

2. The map data update method according to claim 1, further comprising:
   a third step of managing whether or not each map file has been updated using the route-specific update data, and managing whether or not each map file has been updated using the nationwide update data, based upon a serial number added to each map filed, wherein
   said third step includes sub-steps of:
   acquiring, together with the update data, a serial number management file, in which are entered "valid" data in positions corresponding to new serial numbers added to map files to be updated using the update files and storing the serial number management file;
   checking whether the map file has been updated, by checking whether "valid" data has been entered at the serial number position of the map file; and
   each time the map file is updated using the update file, adding said new serial number to the map file.

3. The map data update method according to claim 2, wherein said third step further includes sub-steps of:
   providing, as the serial number management file, a first serial number management file for route-specific update, used to check whether updating has been performed using the route-specific update files included in the route-specific update data, and a second serial number management file for nationwide update, used to check whether updating has been performed using the nationwide update files included in the nationwide update data.

4. A map data update method of updating first nationwide updated version map data which is comprised of a plurality of files using first route-specific update data, and thereafter updating the first nationwide updated version map data using second route-specific update data, or updating the first nationwide updated version map data to a second nationwide updated version map data using nationwide update data, comprising the steps of:
   when performing an update of the first nationwide updated version map data using the second route-specific update data or the nationwide update data after updating using the first route-specific update data, returning the map files updated by the first route-specific update data to the first nationwide updated version map data and then performing an update using the second route-specific update data or the nationwide update data, in a background of navigation control;
   in parallel with the update processing, checking whether map files used in navigation control have been updated using the second route-specific update data or using the nationwide update data; and
   if updating has not been performed, returning the map files to the first nationwide updated version map files, and then performing the update of the first nationwide updated version map files using the second route-specific update data or the nationwide update data, wherein the updated map files are then used in the navigation control.

5. The map data update method according to claim 4, further comprising the steps of:
when using the first route-specific update data to update the first nationwide updated version map data stored in a navigation apparatus, storing pre-update map files necessary to restore the first nationwide updated version map data; and
when using the second route-specific update data or the nationwide update data to perform an update, restoring the first nationwide updated version map files using the stored pre-update map files.

6. A navigation apparatus which comprises update functions to use route-specific update data to update nationwide updated-version map data which is comprised of a plurality of map files, and to use nationwide update data to update the nationwide updated version map data to the next nationwide updated version map data, comprising:
a storage portion, which stores map data to be used in navigation control;
a navigation control portion for performing navigation control;
an update data input portion, for input of route-specific update data and nationwide update data; and
an update processing portion, which performs map updates in a background of the navigation control, and which gives priority to update processing using the route-specific update data over update processing using the nationwide update data, and for map files updated using route-specific update files included in the route-specific update data, which updates the map files at first using nationwide updated files included in the nationwide update data and then updates the map files using said route-specific update files, wherein
said update processing portion includes:
means for checking whether map files used in the navigation control have been updated using the route-specific update data;
means for, if not updated, checking whether the map files have been updated using the nationwide update files included in the nationwide update data; and
means for, if not updated, updating the map files using the nationwide update files included in the nationwide update data, and then updating the map files using the route-specific update files, wherein the updated map files are then used in the navigation control.

7. The navigation apparatus according to claim 6, further comprising a management portion of managing whether each map file has been updated using the route-specific update data and of managing whether each map file has been updated using the nationwide update data, based upon a serial number added to each map file, wherein
said management portion includes;
means for acquiring from said update data input portion, together with the update data, a serial number management file, in which are entered "valid" data in positions corresponding to new serial numbers added to map files to be updated using the update files;
means for storing the acquired serial number management file;
means for checking whether the map file has been updated, by checking whether "valid" data has been entered at the serial number position of the map file; and
means for, each time the map file is updated using the update file, adding said new serial number to the map file.

8. The navigation apparatus according to claim 7, wherein said acquiring means acquires as said serial number management file, a first serial number management file for route-specific update, used to check whether updating has been performed using the route-specific update files included in the route-specific update data, and a second serial number management file for nationwide updates, used to check whether updating has been performed using the update files of the nationwide update data, and said storing means stores these first and second serial number management files.

9. A navigation apparatus, which comprises update functions to update first nationwide updated-version map data which is comprised of a plurality of map files using first route-specific update data, thereafter update the first nationwide updated version map data using second route-specific update data, or update the first nationwide updated version map data to second nationwide updated version map data using nationwide update data, comprising:
a first storage portion, which stores map data to be used in navigation control;
a navigation control portion, which performs navigation control;
an update data input portion, for input of route-specific update data and nationwide update data; and
an update processing portion for updating the first nationwide updated version map data, wherein said update processing portion includes:
first means, which, when using the second route-specific update data or nationwide update data to perform an update after updating using the first route-specific update data, performs updating using the second route-specific update data or the nationwide update data after returning the map files updated by the first route-specific update data to the first nationwide updated version map data in a background of navigation control,
second means which performs a check in parallel with said update processing to determine whether map files to be used in navigation control have been updated using the second route-specific update data or using the nationwide update data, and
third means which, if the map files have not been updated, returns the map files to the first nationwide updated version map files, and then performs an update using the second route-specific update data or the nationwide update data.

10. The navigation apparatus according to claim 9, wherein said update processing portion further includes:
a second storage portion, which stores data necessary to restore the first nationwide updated-version map data, and
means for, when the first route-specific update data is used to update the first nationwide updated-version map data stored in the first storage portion, storing pre-update map files necessary to restore the first nationwide updated version map data in the second storage portion, and
when after the update using the first route-specific update data an update is to be performed using the second route-specific update data or nationwide update data, said first and second means restore the first nationwide updated version map files using the stored pre-update map files and update the first updated version map files using the second route-specific update data or nationwide update data.

11. A map data update method of updating nationwide updated version map data to next nationwide updated version map data using nationwide update data and of updating the next nationwide updated version map data using route-specific update data, comprising:
- a first step of performing map data updating in a background of navigation control in which map data is comprised of a plurality of map files, and giving priority to update processing using the route-specific update data over update processing using the nationwide update data;
- a second step of, for map files updated using route-specific update files included in the route-specific update data, performing an update at first using nationwide update files included in the nationwide update data and then performing an update using the route-specific update files; and
- a third step of managing whether or not each map file has been updated using the route-specific update data, and managing whether or not each map file has been updated using the nationwide update data, based upon a serial number added to each map file, wherein
said second step includes sub-steps of:
- checking whether map files used in the navigation control have been updated using the route-specific update data;
- if not updated using the route-specific update data, checking whether the map files have been updated using the nationwide update files included in the nationwide update data; and
- if not updated using the nationwide update files, updating the map files using the nationwide update files included in the nationwide update data, and then updating the map files using the route-specific update files, wherein the updated map files are then used in the navigation control; and said third step includes sub-steps of:
- acquiring, together with the update data, a serial number management file, in which are entered "valid" data in positions corresponding to new serial numbers added to map files to be updated using the update files and storing the serial number management file;
- checking whether the map file has been updated, by checking whether "valid" data has been entered at the serial number position of the map file; and
- each time the map file is updated using the update file, adding said new serial number to the map file and entering "valid" data at the new serial number position of the map file.

12. A map data update method of updating first nationwide updated version map data which is comprised of a plurality of files using first route-specific update data, and thereafter updating the first nationwide updated version map data using second route-specific update data, or updating the first nationwide updated version map data to a second nationwide updated version map data using nationwide update data, comprising the steps of:
- when performing an update of the first nationwide updated version map data using the second route-specific update data or the nationwide update data after updating using the first route-specific update data, returning the map files updated by the first route-specific update data to the first nationwide updated version map data and then performing an update using the second route-specific update data or the nationwide update data, in a background of navigation control; and
- in parallel with the update processing, checking whether map files used in navigation control have been updated using the second route-specific update data or using the nationwide update data; and
- if updating has not been performed using the second route-specific update data or using the nationwide update data, returning the map files to the first nationwide updated version map files, and then performing the update of the first nationwide updated version map files using the second route-specific update data or the nationwide update data, the updated map files being then used in the navigation control, wherein said map data update method further comprising step of:
managing whether or not each map file has been updated using the route-specific update data, and managing whether or not each map file has been updated using the nationwide update data, based upon a serial number added to each map file, wherein said managing step includes sub-steps of:
- acquiring, together with the update data, a serial number management file, in which are entered "valid" data in positions corresponding to new serial numbers added to map files to be updated using the update files and storing the serial number management file;
- checking whether the map file has been updated, by checking whether "valid" data has been entered at the serial number position of the map file; and
- each time the map file is updated using the update file, adding said new serial number to the map file and entering "valid" data at the new serial number position of the map file.

13. A navigation apparatus which comprises update functions to use route-specific update data to update nationwide updated-version map data which is comprises of a plurality of map files, and to use nationwide update data to update the nationwide updated version map data to the next nationwide updated version map data, comprising:
- a memory for storing map data to be used in navigation control;
- a navigation control portion for performing navigation control;
- an update data input portion, for input of route-specific update data and nationwide update data;
- an update processing portion, which performs map updates in a background of the navigation control, and which gives priority to update processing using the route-specific update data over update processing using the nationwide update data, and for map files updated using route-specific update files included in the route-specific update data, which updates the map files at first using nationwide updated files included in the nationwide update data and then updates the map files using said route-specific update files; and
- a management portion of managing whether each map file has been updated using the route-specific update data and of managing whether each map file has been updated using the nationwide update data, based upon a serial number added to each map file, wherein said update processing portion includes:
- a check portion for checking whether map files used in the navigation control have been updated using the route-specific update data;
- a check portion for, if not updated using the route-specific update data, checking whether the map files have been updated using the nationwide update files included in the nationwide update data; and an update portion for, if not updated using the nationwide update files, updating the map files using the nationwide update files included in the nationwide update data, and then updating the map files using the route-specific update files, wherein the updated map files are then used in the navigation control; and the management portion includes:

an acquisition portion for acquiring from said update data input portion, together with the update data, a serial number management file, in which are entered "valid" data in positions corresponding to new serial numbers added to map files to be updated using the update files;

a memory for storing the acquired serial number management file;

a check portion for checking whether the map file has been updated, by checking whether "valid" data has been entered at the serial number position of the map file; and an update portion of the serial number management file for, each time the map file is updated using the update file, adding said new serial number to the map file and entering "valid" data at the new serial number position of the map file.

14. A navigation apparatus, which comprises update functions to update first nationwide updated-version map data which is comprised of a plurality of map files using first route-specific update data, thereafter update the first nationwide updated version map data using second route-specific update data, or update the first nationwide updated version map data to second nationwide updated version map data using nationwide update data, comprising:

a memory, which stores map data to be used in navigation control;

a navigation control portion, which performs navigation control;

an update data input portion, for input of route-specific update data and nationwide update data;

an update processing portion for updating the first nationwide updated version map data; and a management portion of managing whether each map file has been updated using the route-specific update data and of managing whether each map file has been updated using the nationwide update data, based upon a serial number added to each map file, wherein said update processing portion includes:

a first update portion, which, when using the second route-specific update data or nationwide update data to perform an update after updating using the first route-specific update data, performs updating using the second route-specific update data or the nationwide update data after returning the map files updated by the first route-specific update data to the first nationwide updated version map data in a background of navigation control, check portion for performing a check in parallel with said update processing to determine whether map files to be used in navigation control have been updated using the second route-specific update data or using the nationwide update data, and a second update portion for, if the map files have not been updated, returning the map files to the first nationwide updated version map files, and then performing an update using the second route-specific update data or the nationwide update data, wherein the management portion includes:

an acquisition portion for acquiring from said update data input portion, together with the update data, a serial number management file, in which are entered "valid" data in positions corresponding to new serial numbers added to map files to be updated using the update files;

a memory for storing the acquired serial number management file;

a check portion for checking whether the map file has been updated, by checking whether "valid" data has been entered at the serial number position of the map file; and an update portion for, each time the map file is updated using the update file, adding said new serial number to the map file and entering "valid" data at the new serial number position of the map file.

15. The navigation apparatus according to claim 14, wherein said update processing portion further includes:

a first memory for storing data necessary to restore the first nationwide updated-version map data, and a second memory for, when the first route-specific update data is used to update the first nationwide updated-version map data stored in the first storage portion, storing pre-update map files necessary to restore the first nationwide updated version map data in the second storage portion, and when after the update using the first route-specific update data an update is to be performed using the second route-specific update data or nationwide update data, said first and second update portion restore the first nationwide updated version map files using the stored pre-update map files and update the first nationwide updated version map files using the second route-specific update data or nationwide update data.

* * * * *